(12) United States Patent
Swanson et al.

(10) Patent No.: US 9,772,009 B2
(45) Date of Patent: Sep. 26, 2017

(54) MODULAR TENSIONER SYSTEM

(71) Applicant: KIT MASTERS, Perham, MN (US)

(72) Inventors: Craig Swanson, Perham, MN (US); Dale Scherman, Ottertail, MN (US); Daniel Huwe, Sebeka, MN (US)

(73) Assignee: Kit Masters, Perham, MN (US)

( * ) Notice: Subject to any disclaimer, the term of this patent is extended or adjusted under 35 U.S.C. 154(b) by 35 days.

(21) Appl. No.: 15/167,259

(22) Filed: May 27, 2016

(65) Prior Publication Data

US 2016/0348766 A1 Dec. 1, 2016

Related U.S. Application Data

(60) Provisional application No. 62/168,434, filed on May 29, 2015.

(51) Int. Cl.
*F16H 7/12* (2006.01)
*F16H 7/08* (2006.01)

(52) U.S. Cl.
CPC ... *F16H 7/1245* (2013.01); *F16H 2007/0819* (2013.01); *F16H 2007/0842* (2013.01); *F16H 2007/0865* (2013.01)

(58) Field of Classification Search
CPC .............. F16H 7/12; F16H 2007/0865; F16H 2007/0893; F16H 2007/081; F16H 7/1281; B60H 1/00507
See application file for complete search history.

(56) References Cited

U.S. PATENT DOCUMENTS

| | | | |
|---|---|---|---|
| 4,902,267 A | 2/1990 | Henderson | |
| 5,470,207 A | 11/1995 | Shockey et al. | |
| 6,231,465 B1 | 5/2001 | Quintus | |
| 6,679,692 B1* | 1/2004 | Feuling | F04C 2/102 418/171 |
| 6,719,502 B2 | 4/2004 | Sieradzki | |
| 2004/0102271 A1* | 5/2004 | Serkh | F16H 7/1218 474/101 |
| 2011/0207568 A1 | 8/2011 | Smith et al. | |
| 2013/0095967 A1* | 4/2013 | Wolf | F16H 7/1281 474/135 |

OTHER PUBLICATIONS

International Search Report and Written Opinion of the International Searching Authority issued Sep. 2, 2016, in PCT/US16/34561, filed May 27, 2016.

* cited by examiner

*Primary Examiner* — David Bryant
*Assistant Examiner* — Lee A Holly
(74) *Attorney, Agent, or Firm* — Gardella Grace P.A.

(57) ABSTRACT

A tensioner system may be replaced by selecting replacement components. Components such as a housing, roller arm, pulley, and index plate locating pin may be selected from a group of housings, roller arms, pulleys, and index plate locating pins, respectively. The selection of the components allows a user to assemble multiple variations of tensioner that are commercially available. The location of the index plate locating pin on the index plate allows for proper orientation of the tensioner in the vehicle in order to apply the proper tension to a belt. The selection of the components may be based on current tensioner model, or based on dimensions measured from the current tensioner.

12 Claims, 40 Drawing Sheets

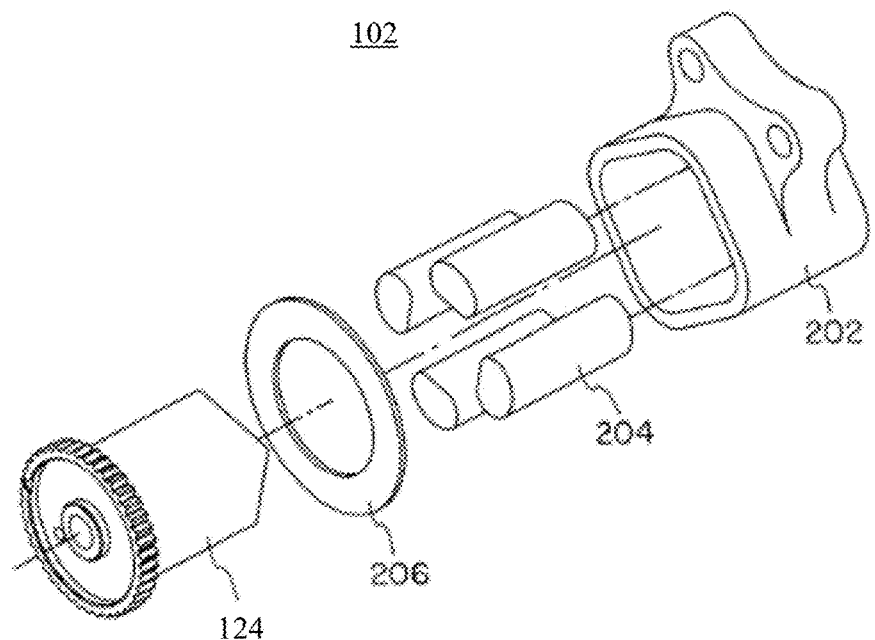
*Fig. 2A*
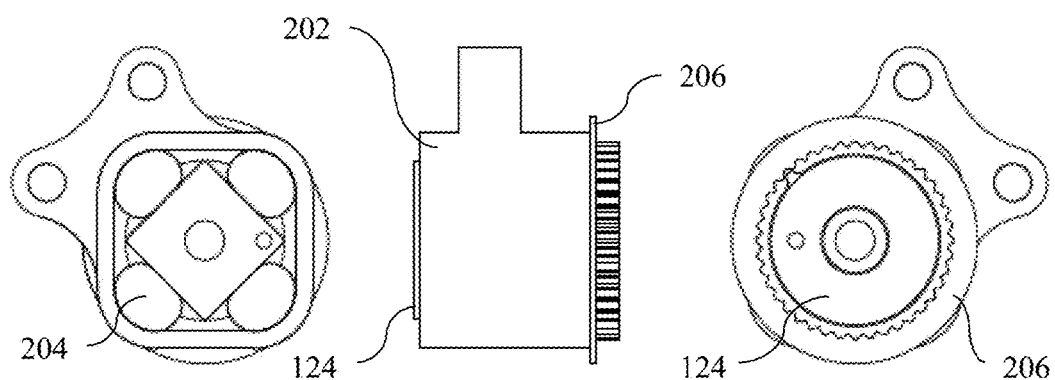
*Fig. 2B*   *Fig. 2C*   *Fig. 2D*

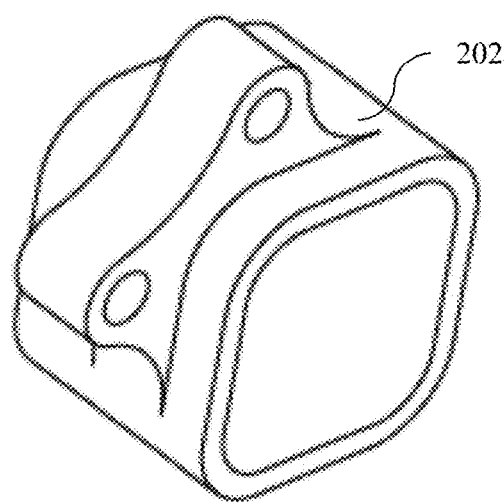
Fig. 4A
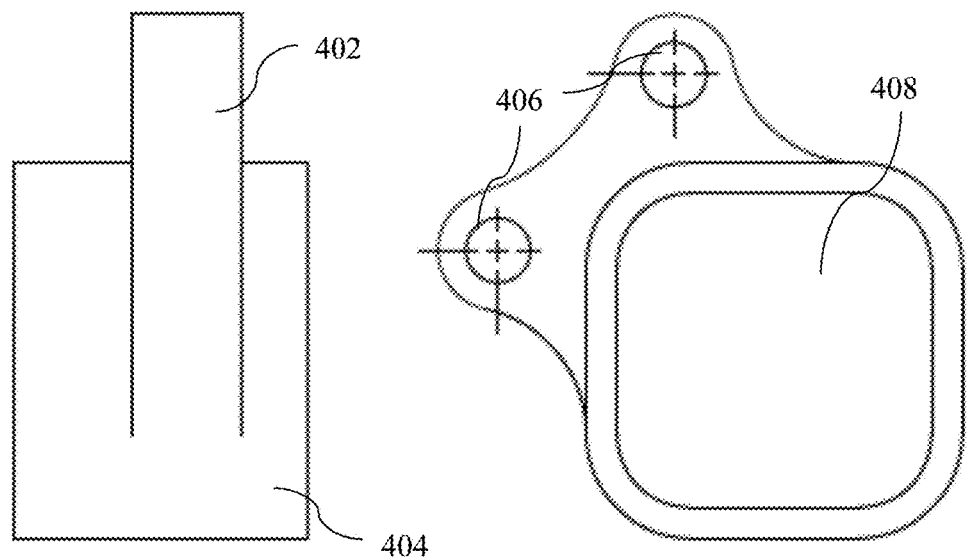
Fig. 4B                Fig. 4C

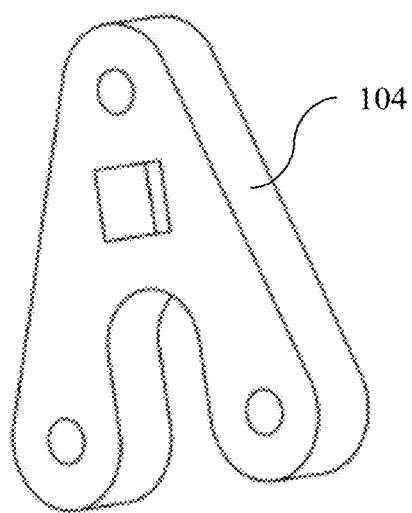
*Fig. 5A*
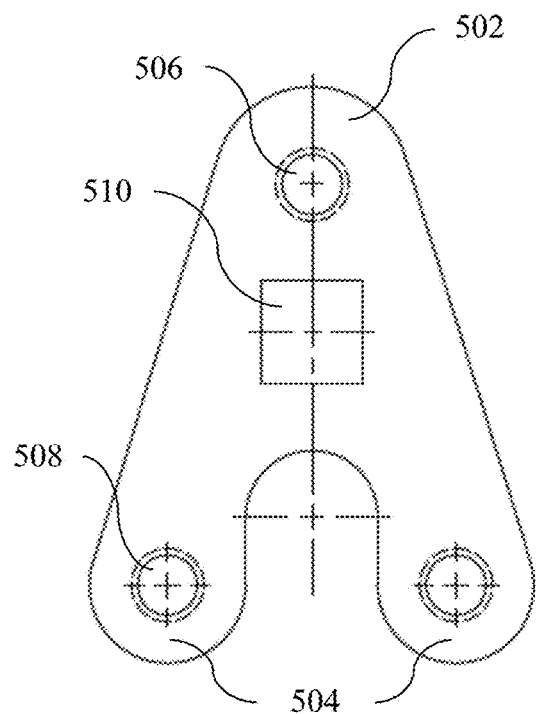
*Fig. 5B*  *Fig. 5C*

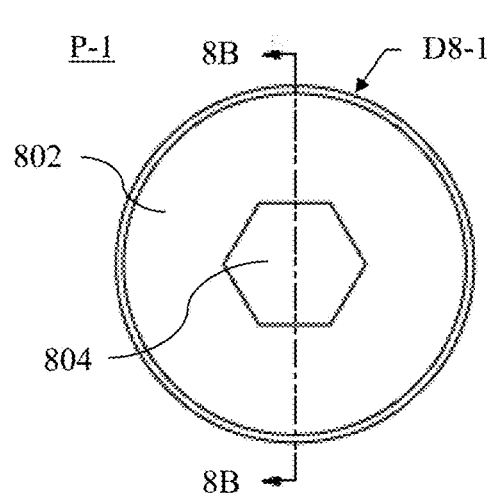
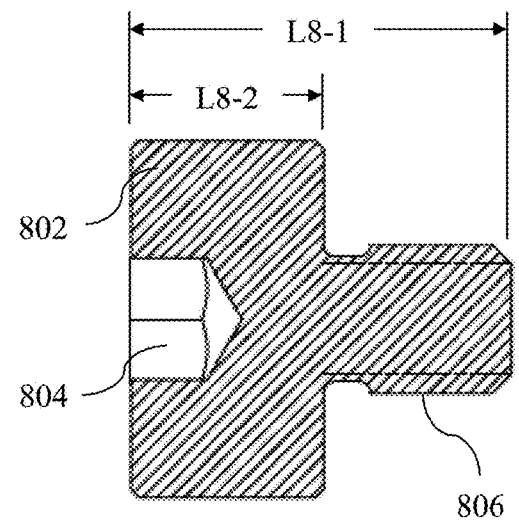
*Fig. 8A*  *Fig. 8B*
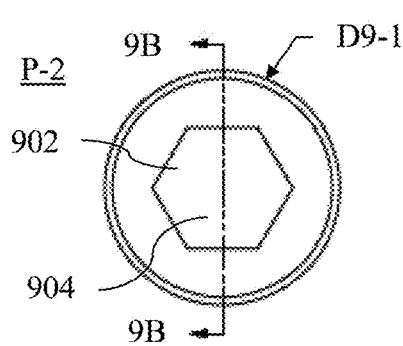
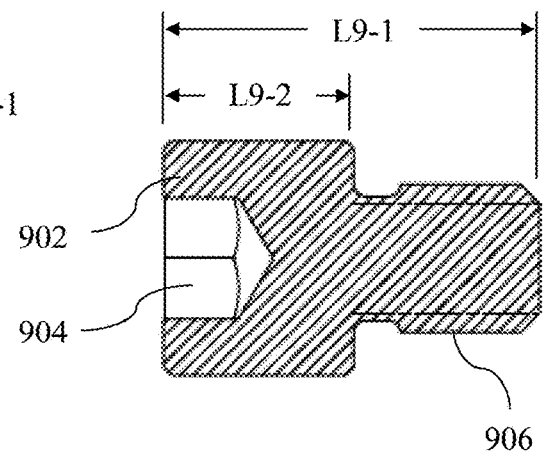
*Fig. 9A*  *Fig. 9B*

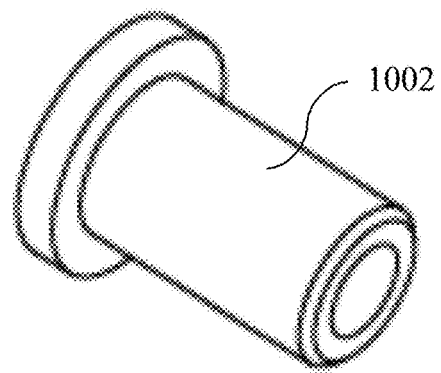
*Fig. 11A*
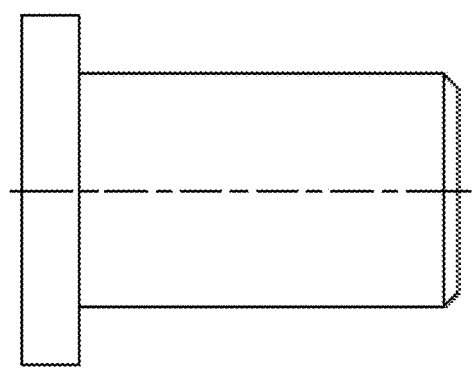 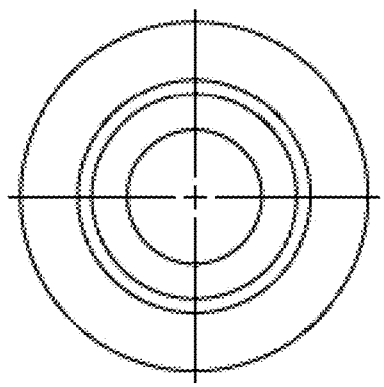
*Fig. 11B*         *Fig. 11C*

Step 1301 — Determine tensioner part number or take measurements of the current tensioner and engine block Step 1302 — Selection of replacement components based on measurements

*Fig. 13*

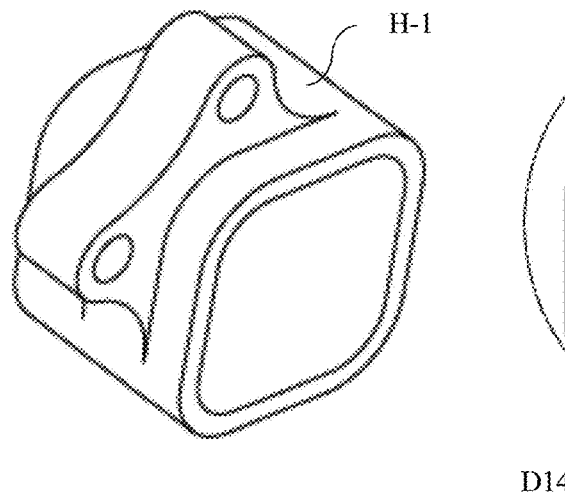
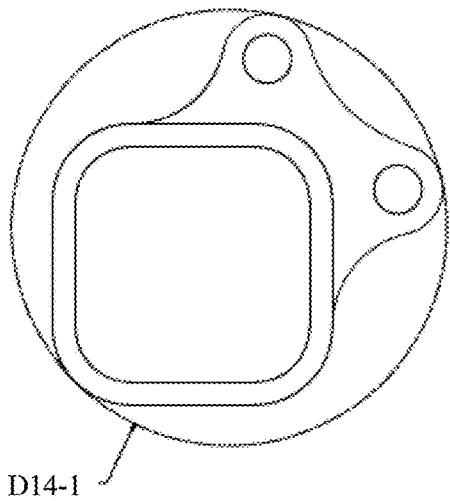
*Fig. 14A*  *Fig. 14B*
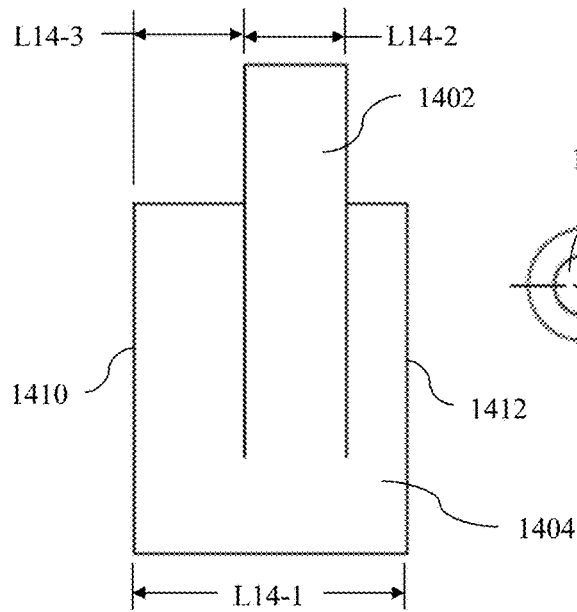
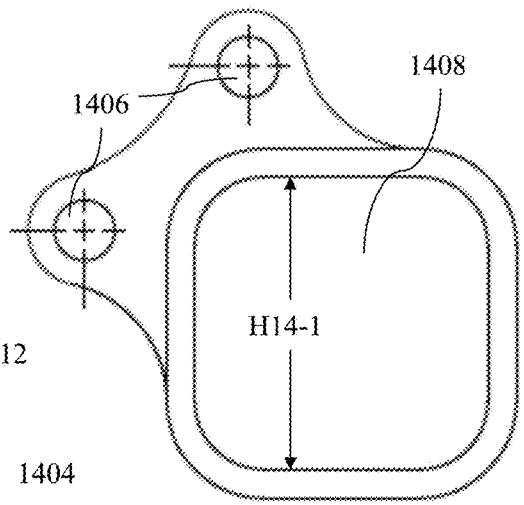
*Fig. 14C*  *Fig. 14D*

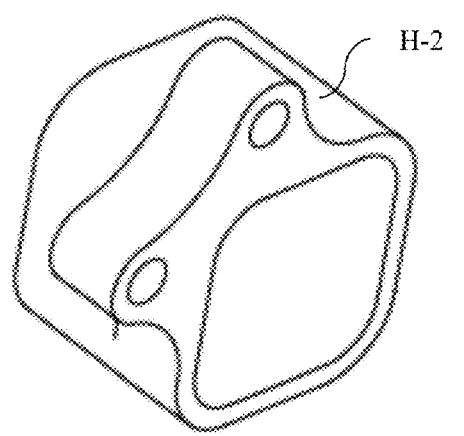
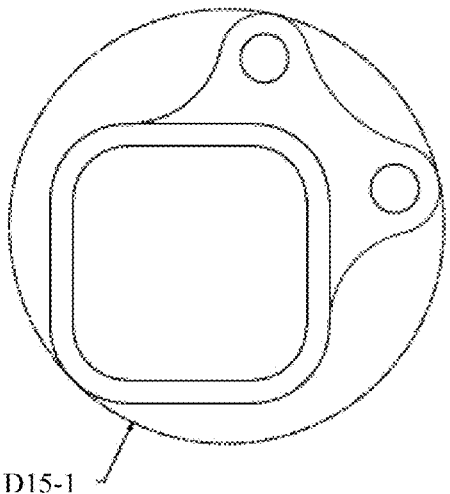
Fig. 15A
Fig. 15B
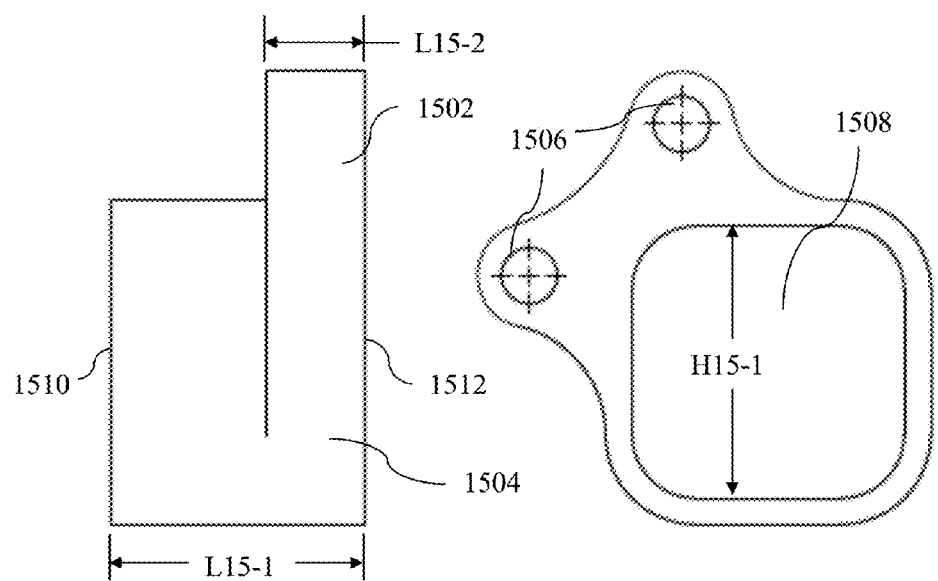
Fig. 15C
Fig. 15D

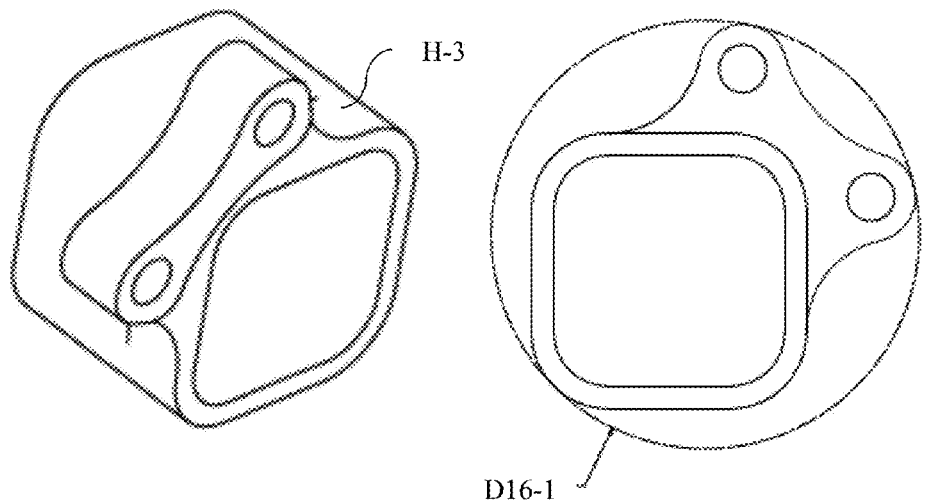
*Fig. 16A*  *Fig. 16B*
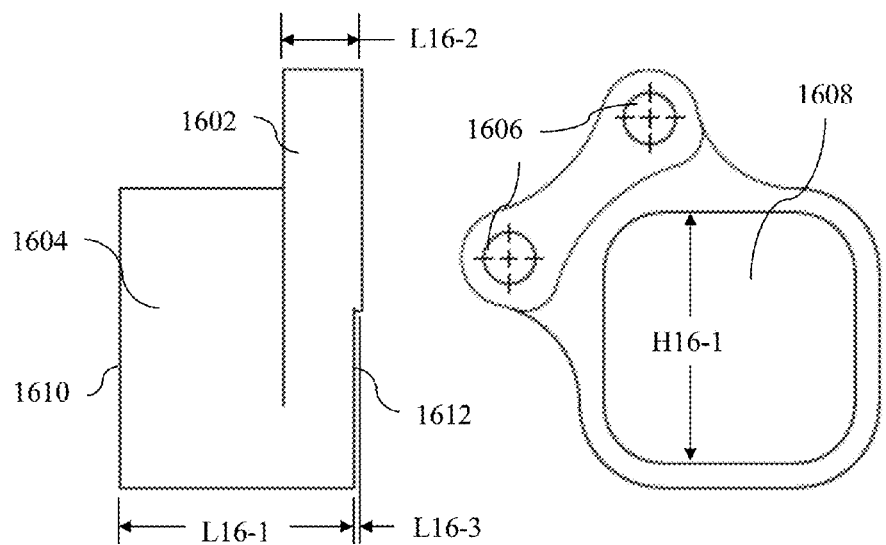
*Fig. 16C*  *Fig. 16D*

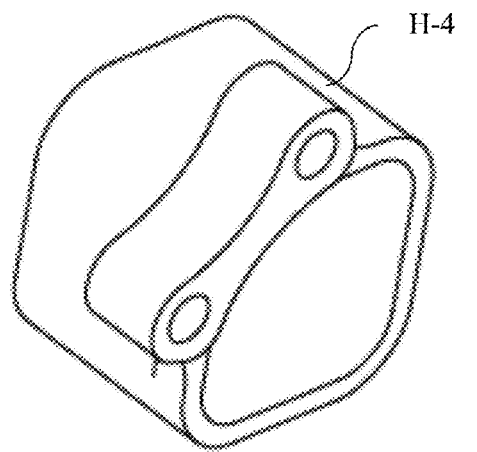
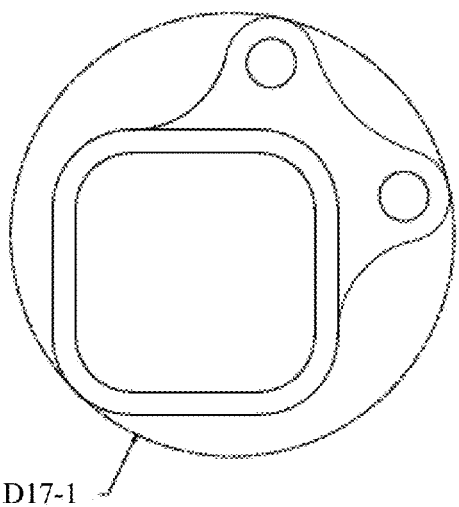
Fig. 17A  Fig. 17B
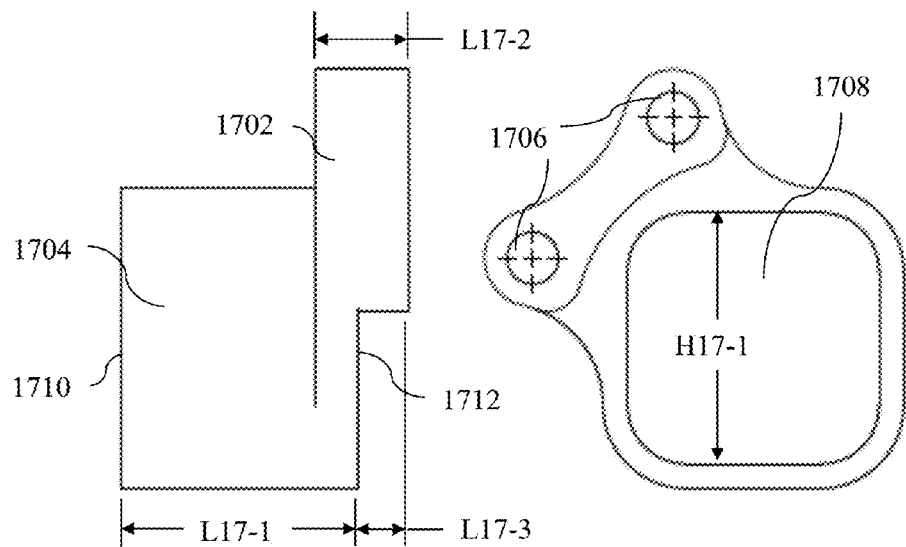
Fig. 17C  Fig. 17D

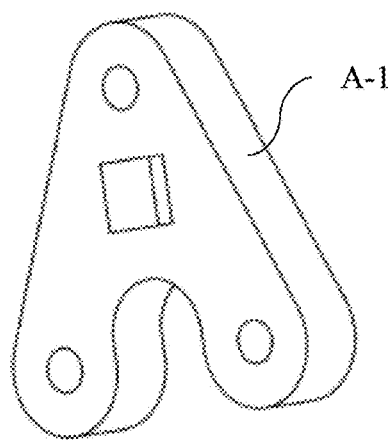
*Fig. 18A*
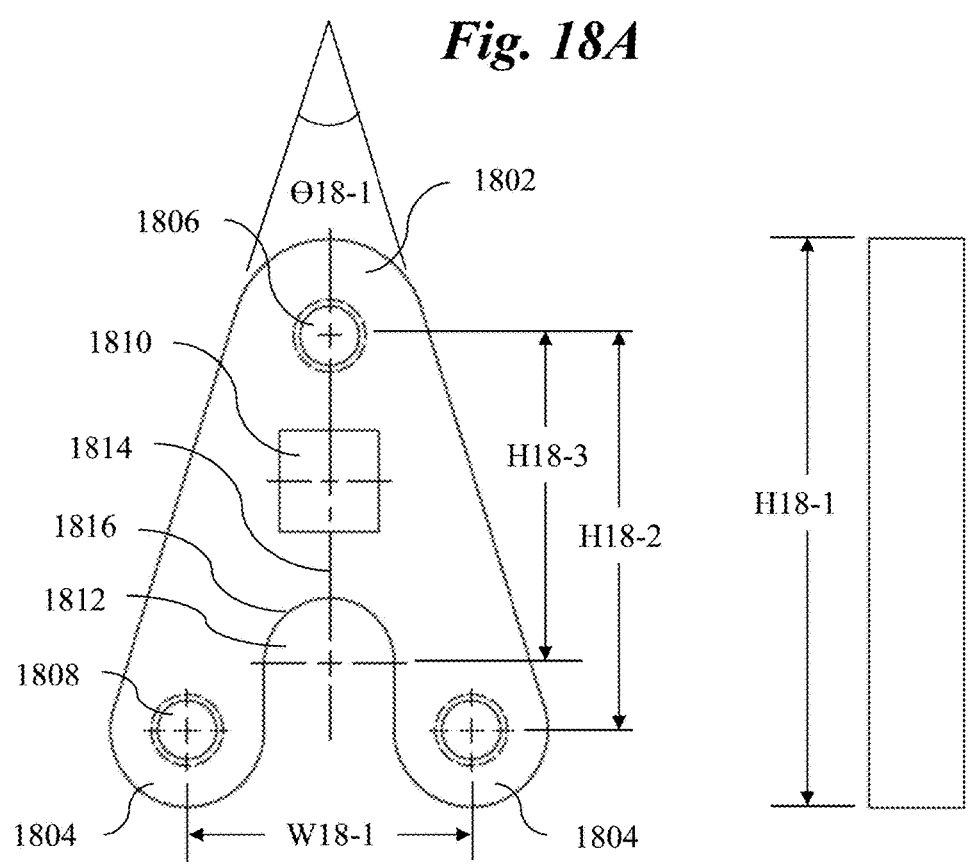
*Fig. 18B*           *Fig. 18C*

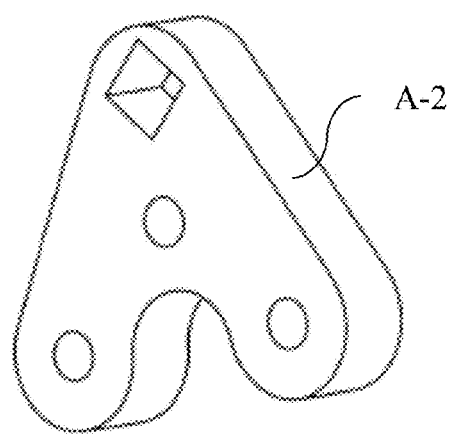
*Fig. 19A*
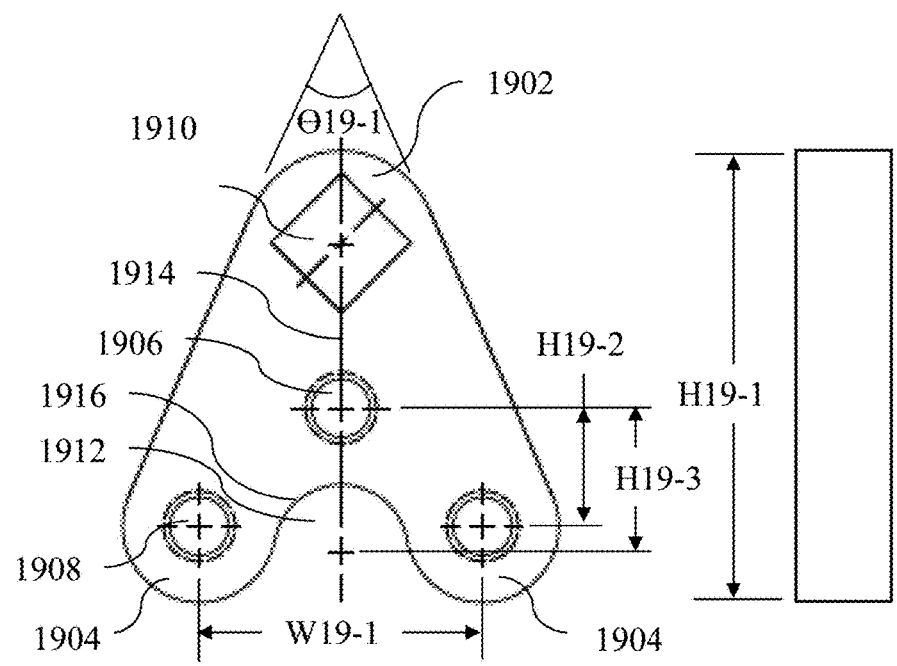
*Fig. 19B*                *Fig. 19C*

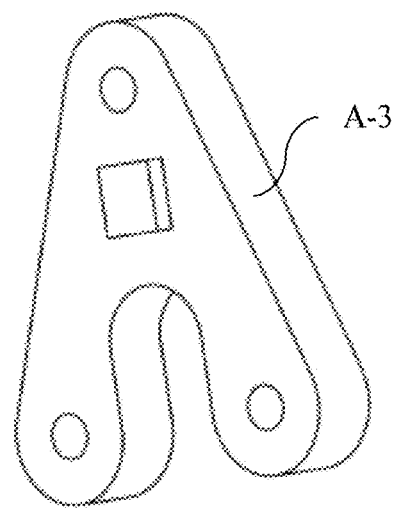
*Fig. 20A*
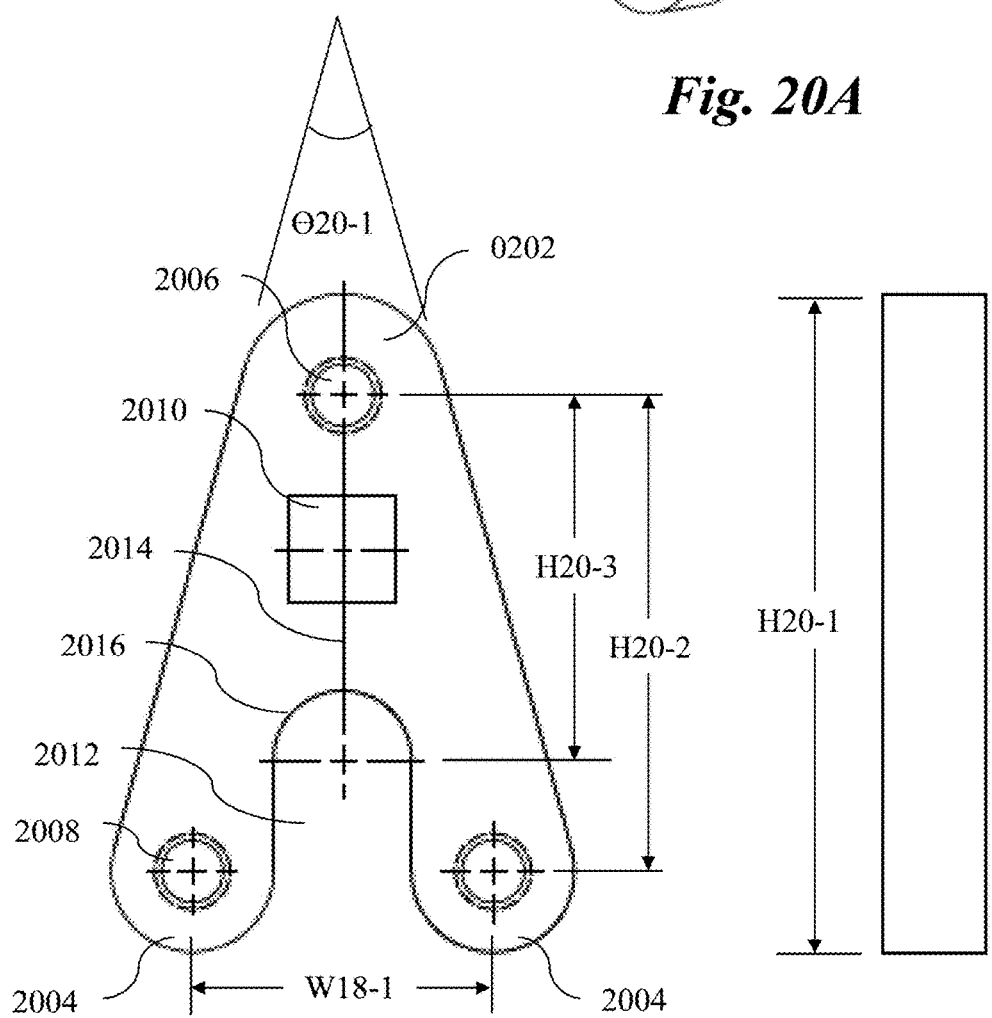
*Fig. 20B*  *Fig. 20C*

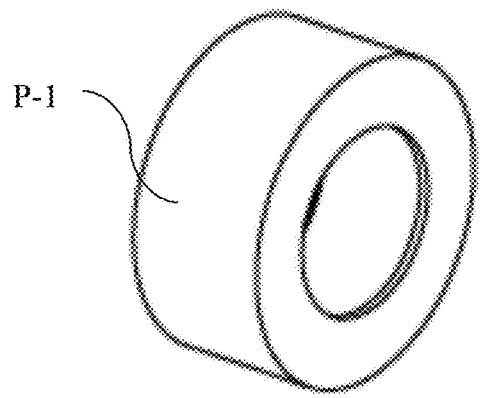
*Fig. 21A*
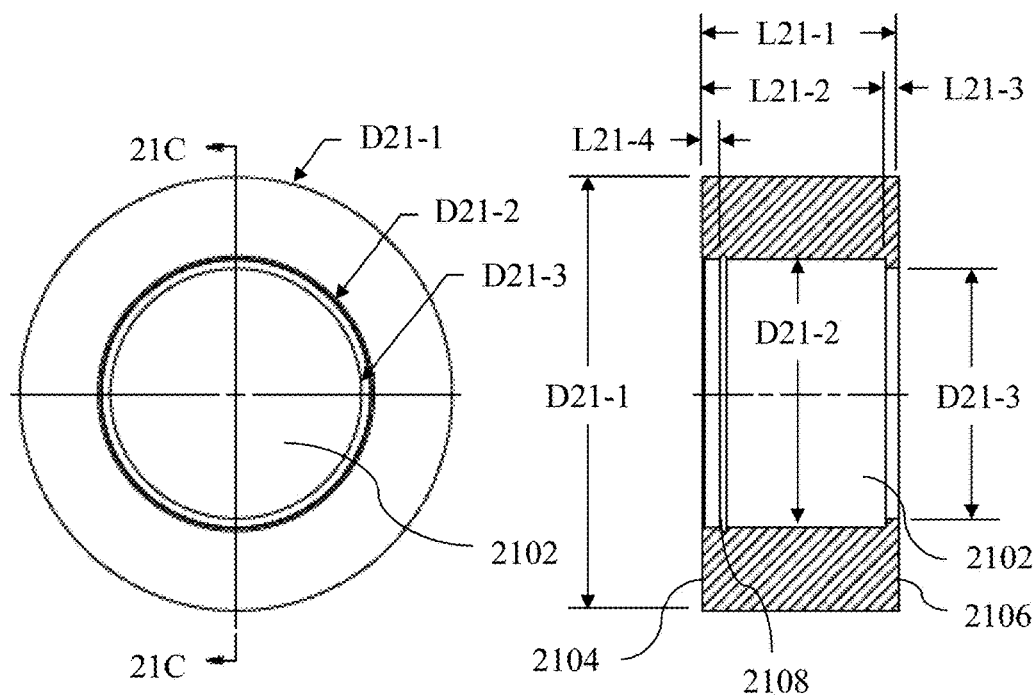
*Fig. 21B*  *Fig. 21C*

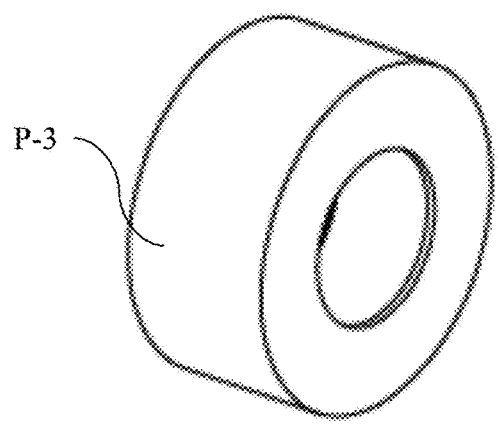
*Fig. 23A*
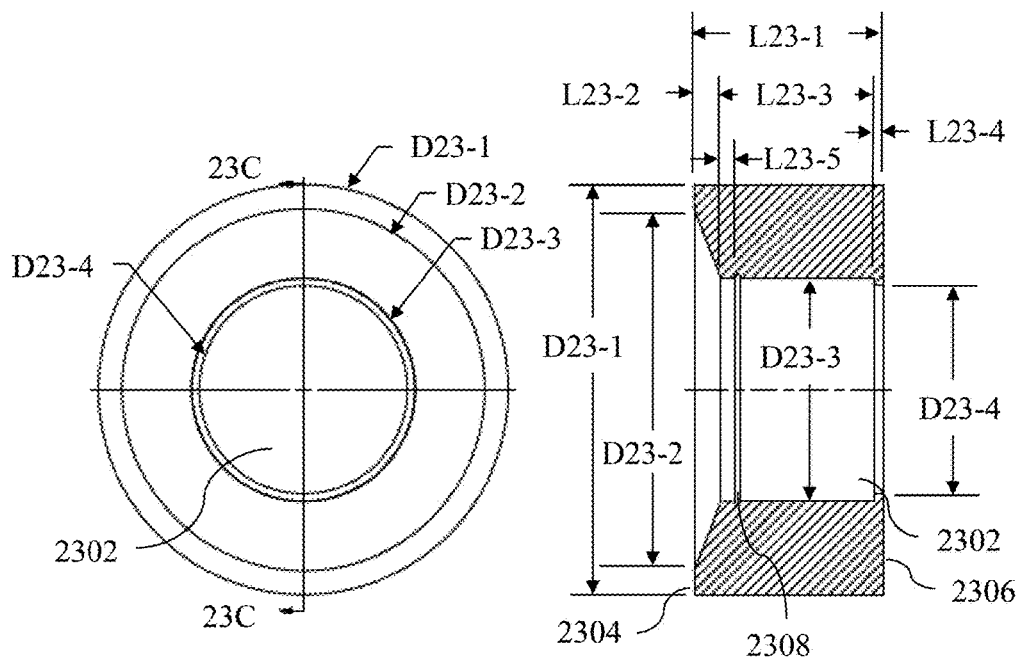
*Fig. 23B*   *Fig. 23C*

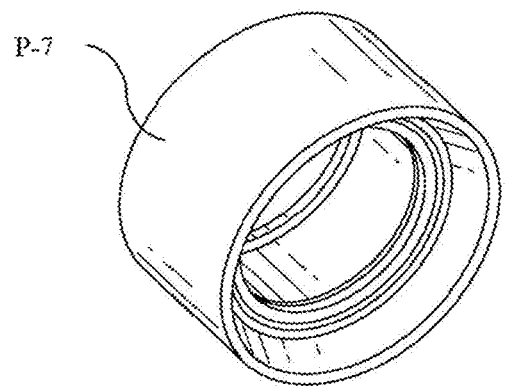
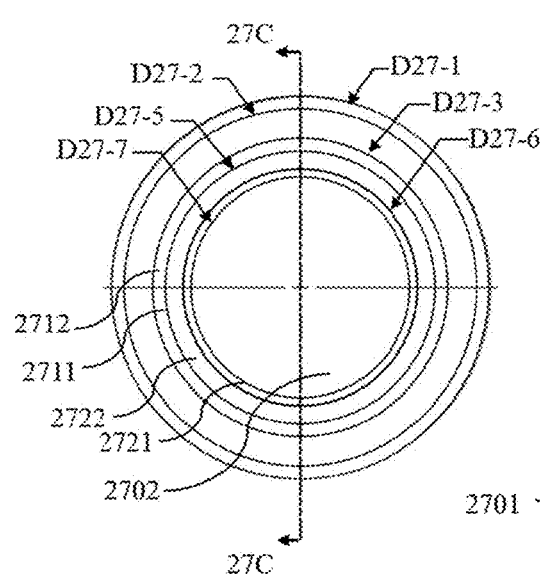
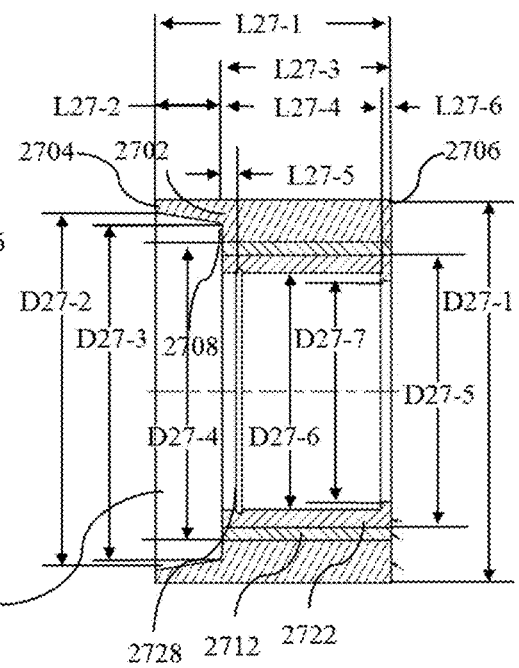
Fig. 27A
Fig. 27B
Fig. 27C

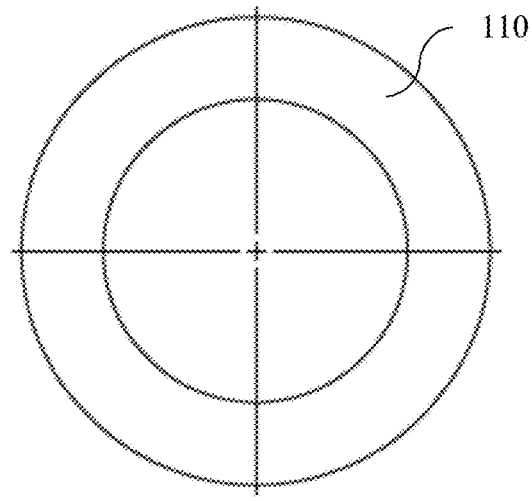
*Fig. 31A*  *Fig. 31B*
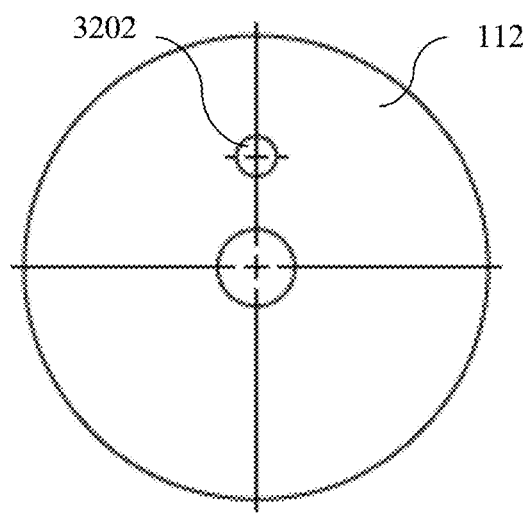
*Fig. 32A*  *Fig. 32B*

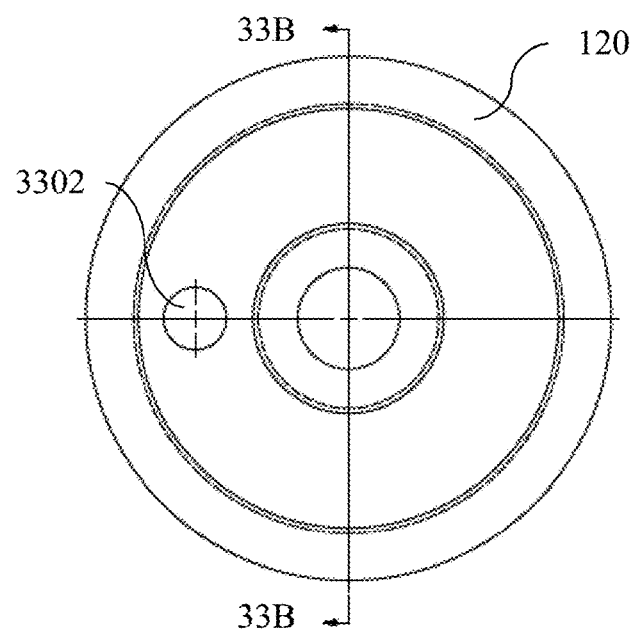 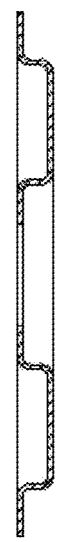
*Fig. 33A*  *Fig. 33B*

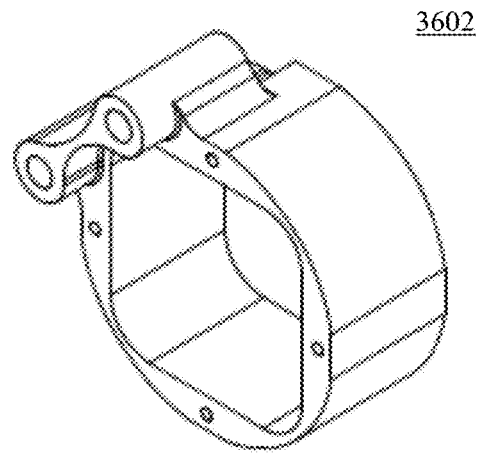
*Fig. 37A*
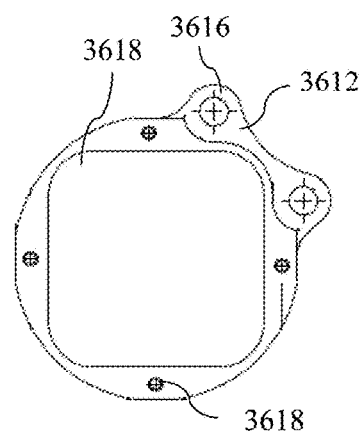 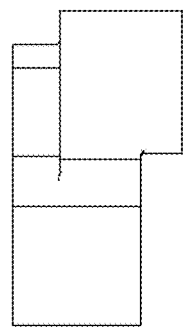 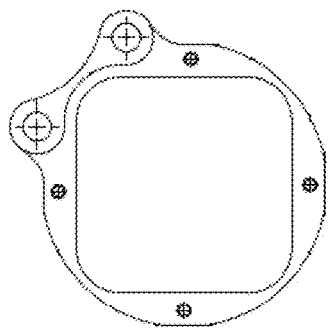
*Fig. 37B*  *Fig. 37C*  *Fig. 37D*

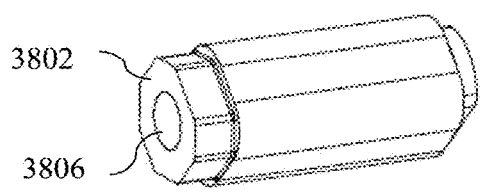
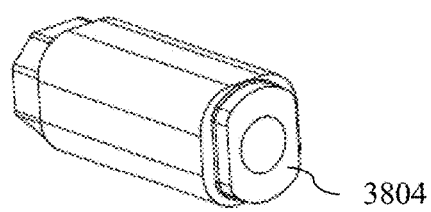
Fig. 38A Fig. 38B
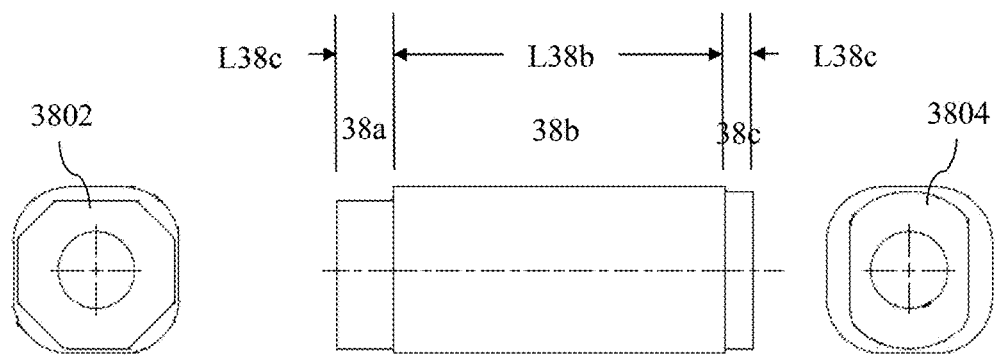
Fig. 38C Fig. 38D Fig. 38E

MODULAR TENSIONER SYSTEM

CROSS-REFERENCE TO RELATED APPLICATIONS

This application claims priority to U.S. Application No. 62/168,434, filed on May 29, 2015, the entire content of which is incorporated in the present document by reference.

BACKGROUND

A conventional tensioner in an engine provides a force to a belt or chain to keep the belt or chain in tension. The tensioner on the belt or chain assures that the main driving pulley does not become loose. The amount of force applied to the belt or chain may be adjustable. There are many different methods to apply a varying force to the belt, such as a spring.

Tensioners may have different design parameters based on their application. When a tensioner assembly fails, components may be replaced with compatible replacement components. Given the wide range of applications for tensioners, there are numerous models and makes, each with their own integral systems. In the heavy duty tensioner market, manufacturers may have to build and stock thousands of different parts to provide a replacement for each model of tensioner, as each model of tensioner requires model-specific replacement parts.

SUMMARY

A tensioner may be replaced by selecting and assembling replacement components of a modular tensioner system. In an illustrative embodiment, components such as a housing, roller arm, pulley, and index plate locating pin may be selected from a group of housings, roller arms, pulleys, and index plate locating pins, respectively. The selection of the components allows a user to assemble multiple tensioners that are commercially available. In an illustrative embodiment, the location of the index plate locating pin on the index plate allows for proper orientation of the tensioner in the vehicle in order to apply the proper tension to a belt. The selection of the components may be based on the current tensioner model, or based on dimensions measured from the current tensioner.

Accordingly, in the illustrative embodiments, a range of models of tensioner systems may be replaced by using a limited number of parts. As different models of tensioner systems may be replaced using a limited number of parts, the in-stock inventory of replacements parts may be reduced.

BRIEF DESCRIPTION OF THE DRAWINGS

The characteristics and advantages of an exemplary embodiment are set out in more detail in the following description, made with reference to the accompanying drawings.

FIGS. 2A-D depict a schematic isometric exploded, rear, side, and front view of a torsion assembly;

FIGS. 4A-C depict a schematic isometric, left side, and front view of a housing;

FIGS. 5A-C depict a schematic isometric, front and side view of a roller arm;

FIGS. 8A-B depict a front and cross-sectional view of a first locating pin;

FIGS. 9A-B depict a front and cross-sectional view of a second locating pin;

FIG. 11A-C depict a schematic isometric, a side and a front view of a shoulder spacer;

FIG. 13 depicts a flow chart for measuring an existing tensioner in order to identify the component to assemble a replacement tensioner system;

FIGS. 14A-D depict respectively a schematic isometric, rear, side, and front view of a first housing;

FIGS. 15A-D depict respectively a schematic isometric, rear, side, and front view of a second housing;

FIGS. 16A-D depict respectively a schematic isometric, rear, side, and front view of a third housing;

FIGS. 17A-D depict respectively a schematic isometric, rear, side, and front view of a fourth housing;

FIGS. 18A-C depict respectively a schematic isometric, front, and side view of a first roller arm;

FIGS. 19A-C depict respectively a schematic isometric, front, and side view of a second roller arm;

FIGS. 20A-C depict respectively a schematic isometric, front, and side view of a third roller arm;

FIGS. 21A-C depict respectively a schematic isometric, front, and cross-sectional view of a first pulley;

FIGS. 23A-C depict respectively a schematic isometric, front, and cross-sectional view of a third pulley;

FIGS. 27A-C depict respectively a schematic isometric, front, and cross-sectional view of a seventh pulley;

FIGS. 31A-B depict respectively a front and side view of a washer;

FIGS. 32A-B depict respectively a front and side view of a retainer plate;

FIGS. 33A-B depict respectively a front and cross-sectional view of an index plate retainer

FIGS. 37A-D depict respectively a isometric, front, side, and rear view of an outer housing; and FIGS. 38A-E depict respectively isometric, front, side, and rear view of an torsion bar.

DETAILED DESCRIPTION

Objects, advantages, and features of the exemplary modular tensioner system described herein will be apparent to one skilled in the art from a consideration of this specification, including the attached drawings.

A universal modular tensioner system may replace tensioner designs currently in service. In an exemplary embodiment, a user who knows the type of tensioner currently in use in his vehicle may determine which modular components to use to replace the tensioner currently in use in his vehicle, thereby allowing a tensioner system to be replaced by a system assembled from the selected modular components.

Alternatively, in another embodiment, a user may take measurements of the tensioner currently in use in a vehicle, and be able to determine which modular components are needed to replace the tensioner currently is use, thereby allowing a tensioner system to be replaced.

In this manner, a repair location would only need to keep the various modular components to assemble a replacement tensioner system, rather than a replacement tensioner for each commercially available tensioner on the market.

Figure 1:
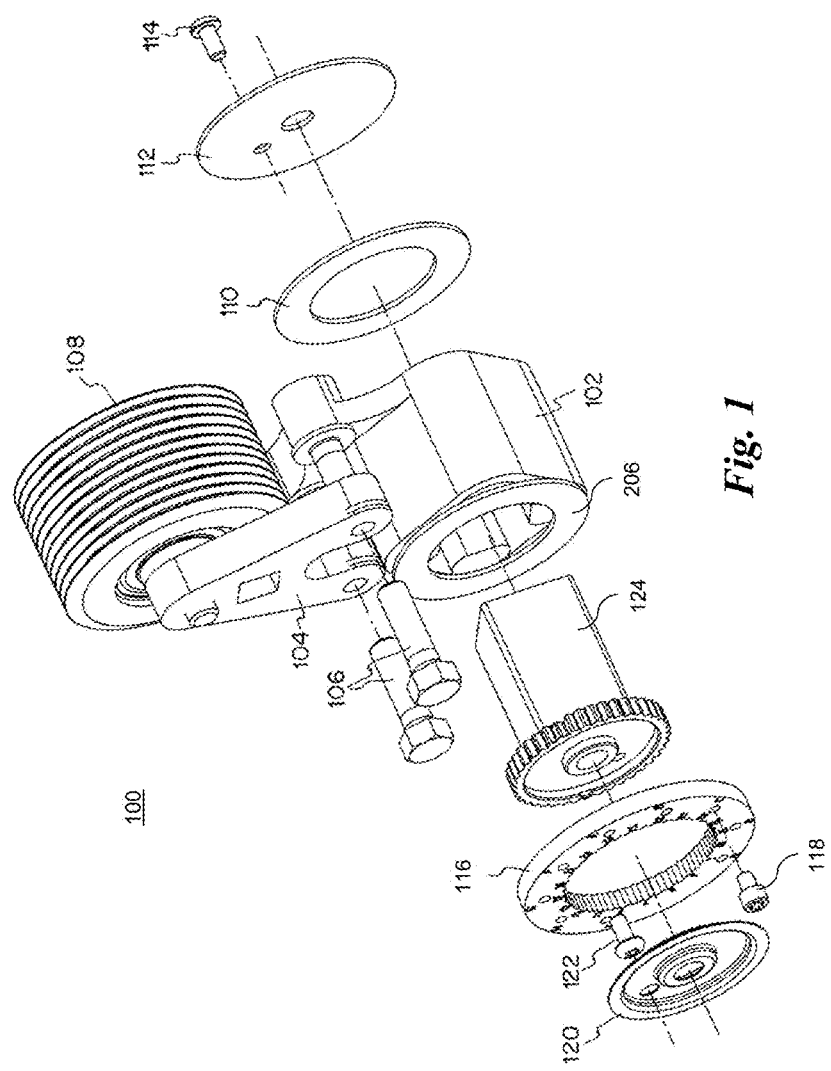
FIG. 1 depicts a schematic isometric exploded view of one embodiment of a modular tensioner system.

In the present disclosure, all of the figures are drawn to scale, to show the comparative ratios of each of the individual components. FIG. 1 illustrates a schematic isometric view of an exemplary embodiment of a modular tensioner system 100. The modular tensioner system 100 may include a torsion shaft assembly 102, a roller arm 104, roller arm retaining fasteners 106, a pulley 108, anti-friction disks 110 and 206, a retainer plate 112, a retainer plate screw 114, a splined index plate 116, an index plate locating pin 118, an index plate retainer 120, an index plate retainer screw 122, and a splined torsion shaft 124.

The torsion shaft assembly 102 may be connected to the lower portion of the roller arm 104 by way of the two roller arm retainer fasteners 106. The torsion shaft assembly 102 will be discussed in more detail later in the disclosure, for example, see FIGS. 2A-2D. The pulley 108 may be connected to the upper portion of the roller arm 104. The splined torsion shaft 124 may be inserted in the torsion shaft assembly. An anti-friction disk 206 may be placed between the splined torsion shaft 124 and the torsion shaft assembly 102. The splined torsion shaft 124 will be discussed in more detail later in the disclosure, for example, see FIGS. 3A-3C. When the splined torsion shaft 124 is inserted in the torsion shaft assembly 102, the end of the splined torsion shaft 124 may extend past the torsion shaft assembly 102. The anti-friction disk 110 is placed around the splined torsion shaft 124 on the opposite end from which the splined torsion shaft 124 was inserted. A retainer plate 112 is placed on the anti-friction disk 110 and the retainer plate is secured to the splined torsion shaft 124 by a retainer screw 114 that fastens to the splined torsion shaft 124 through the retainer plate 112.

The splined index plate 116 may be placed on the splined torsion shaft 124 in a manner that allows the splined index plate 116 and the splined torsion shaft 124 to rotate together. The index plate locating pin 118 may be inserted and fastened into the splined index plate 116. The index plate retainer 120 may be placed on the splined index plate 116 and secured by an index plate retainer screw 122 that secures the index plate retainer 120 to the splined torsion shaft 124.

The location of the index plate locating pin 118 in the splined index plate 116 allows for the proper orientation of the tensioner in the vehicle in order to apply the proper tension to a belt. The location of the index plate locating pin 118 allows a user to assemble modular components of a modular tensioner system 100 that may replace numerous tensioners commercially available. The index plate locating pin 118 may be place anywhere along the outer circumference, or 360°, of the splined index plate 116. In a non-limiting embodiment, the splined index plate 118 may have 40 teeth, with nine holes 35 degree apart. Using this combination of holes and teeth, the splined index plate 118 may achieve 360° coverage. The splined index plate 116 and the index plate locating pin 118 will be discussed in further detail later in the disclosure, for example, see FIGS. 7-9.

The combination of the modular components allows a user to create a tensioner to replace the tensioner already in his vehicle. Several of the modular components are interchangeable with additional similar component embodiments.

Some variables in creating a modular tensioner system may be the size and design of a housing 202 of the torsion shaft assembly 102, the roller arm 104, the pulley 108, the index plate locating pin 118 and the location of the index plate locating pin 118. In one embodiment of the modular tensioner system 100, the housing 202 may come in four different embodiments, the pulley 108 may come in ten different embodiments, the arm 104 may come in three different embodiments, and the index plate locating pin 118 may come in two different embodiments. Selecting one of each of these components allows a user to create a replacement tensioner.

The number and types of models for housings, roller arms, and pulleys may be based on sizing and dimensional specifications, such that the combination covers a wide range of tensioners. In one embodiment, a number of parts for replacing the wide range of tensioner systems may be reduced.

FIG. 2A illustrates a generic schematic isometric view of a torsion assembly 102 according to the modular tensioner system 100 in FIG. 1. The torsion assembly 102 may include the housing 202, a plurality of springs 204, the anti-friction disk 206, and the splined torsion shaft 124. The springs 204 may be made of an elastic material, such as rubber, composites, polymers, or the like. The plurality of springs 204 may be located in each inside corner of the housing 202. Alternatively, the springs may be positioned within the housing in order to produce a sufficient amount of force against the splined torsion shaft 124. The plurality of springs 204 may be held in place by the splined torsion shaft 124 when the splined torsion shaft 124 is inserted in the housing 202. The anti-friction disk 206 may be sandwiched between the splined torsion shaft 124 and the housing 202. The plurality of springs 204 provides comparable torques to tensioners commercially available. The splined torsion shaft 124 is discussed in more detail in FIGS. 3A-3C. FIG. 2A merely illustrates a generic torsion shaft assembly because the individual components of the torsion shaft assembly may be chosen from a number of different embodiments themselves.

FIGS. 2B-2D illustrate a front, side and rear view of the torsion assembly 102. The length of the splined torsion shaft 124 may exceed the length of the housing 202. As illustrated in FIG. 2C, the splined torsion shaft 124 extends through the housing 202, according to one embodiment. FIGS. 2A-2D merely illustrates a generic torsion shaft assembly because the individual components of the torsion shaft assembly may be chosen from a number of different embodiments themselves.

Figures 3A, 3B, 3C:
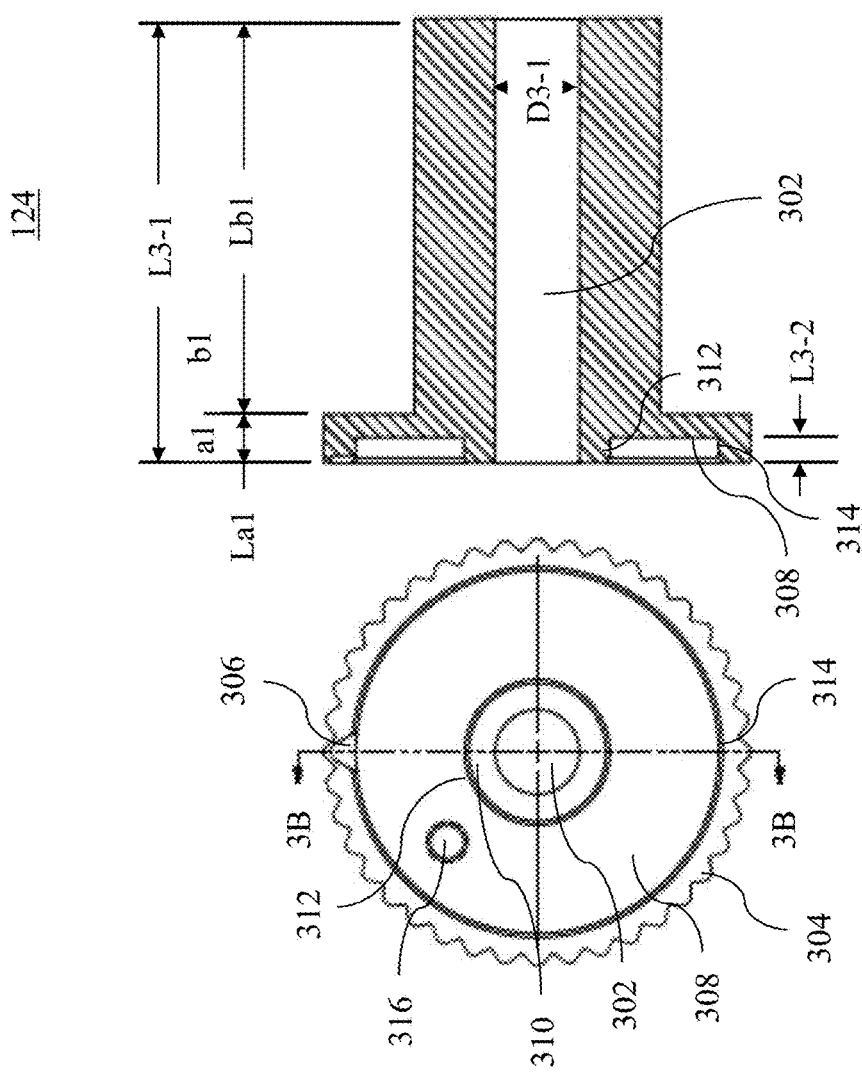
FIGS. 3A-C depict a front, cross-sectional, and rear view of a splined torsion shaft.

FIGS. 3A-3C illustrate a front, cross-sectional, and back view of the splined torsion shaft 124. The splined torsion shaft 124 has a characteristic length L3-1. The splined torsion shaft 124 has two sections a1 and b1, with a through hole 302 extending through the length of the splined torsion shaft 124. Section a1 may be a gear with a plurality of teeth 304. Section b1 may be a torsion bar that is attached to the gear.

Referring to FIG. 3A, a front view of the splined torsion shaft 124 is illustrated, including section a1. The through hole 302 is at the center of the section a1. The diameter D3-1 of the through hole 302 may be 0.3 and 0.5 inches, but more preferably between 0.35 and 0.45 inches. The plurality of teeth 204 are located on the outer circumference of section a1. In one embodiment, shown in FIG. 3A, the splined torsion shaft 124 illustrates forty teeth that correspond with teeth of the splined index plate 116. However, the present disclosure is not so limited, and the number of teeth may be greater to or less than forty. Beneath one of the plurality of teeth 304 is an engraved indictor arrow 306. The indicator arrow 306 will be discussed in more detail later in the disclosure.

Section a1 further includes a recessed portion 308. The recessed portion 308 creates a circumferential channel in the gear. The through hole 302 has projected portion 310 that projects past the recessed portion 308. The recessed portion is further chamfered at its inner circumference 312 and its outer circumference 314. The recessed portion's 308 depth or length L3-2 is shorter than the length of section a1. The depth or length of the recess portion 308 is illustrated in FIG. 3B.

Further, a threaded hole 316 is located within the recessed portion 308. The threaded hole 316 accommodates the index plate retainer screw 122. The index plate retainer screw 122 attaches the index plate retainer 120 to the splined torsion shaft 124.

FIG. 3B is a cross-sectional view of the splined torsion shaft 124 according to cross section line 3B in FIG. 3A. FIG. 3B illustrates the various lengths of the splined torsion shaft 124. The length of section a1, La1, may be between 0.15 and 0.30 inches, but more preferably between 0.20 and 0.25 inches. The length of section b1, Lb1, may be between 1.7 and 2.1 inches, but more preferably between 1.85 and 1.95 inches. The ratio between Lb1 and La1 may be between 5.6 and 14, but more preferably between 7.4 and 9.75.

FIG. 3C illustrates a rear side view of the splined torsion shaft 124. The through hole 302 is illustrated, and the through hole 302 extends from the front of the splined torsion shaft 124 to the back of the splined torsion shaft 124. The illustrated torsion bar of section b1 of the splined torsion shaft 124 may have a square cross section. The height and length of the splined torsion shaft bar 124 may be between 1.1 and 1.3 inches, but more preferably between 1.15 and 1.25 inches. Although, the bar does not have to be a square cross section as illustrated in FIG. 3C, a variety of different cross sections may be used, such as circular, hexagonal, triangular, a cam design, a combination profile, or the like.

The torsion bar of section b1 further includes a threaded hole 318. The threaded hole 318 accommodates the retainer plate screw 114. The index plate retainer screw 114 attaches the retainer plate 112 to the splined torsion shaft 124.

FIGS. 4A-4C illustrate a generic housing 202. The housing component 202 includes an attachment extension 402 that extends from the housing body 404. The attachment extension 402 includes plurality of attachment extension through holes 406 that extend longitudinally through the attachment extension 402. The roller arm 104 attaches to the housing by way of the attachment extension 402. The roller arm retaining fasteners 106 secure the arm to the housing 202. The housing body 404 further includes a housing body through hole 408 that allows the rubber spring 204 and the splined torsion shaft 124 to be inserted into the housing body 404. FIGS. 4A-4C merely illustrate a generic housing 202 because the housing 202 may come in many different shapes and sizes. For example, four different housing embodiments are illustrated in FIGS. 14-17, and will be discussed in more detail later in the disclosure.

FIGS. 5A-C illustrate a generic roller arm 104. FIGS. 5A-5C merely illustrate a generic roller arm 104 because the roller arm 104 may come in many different shapes and sizes. The generic roller arm 104 has a first end 502 and a second end 504. The first end 502 has a thread through hole 506, whereby the pulley may be attached to the first end 502 of the roller arm 104. The second end has two arms, whereby each arm has a threaded through hole 508 for attaching the roller arm 104 to the attachment extension 402 of the housing component 202 by means of the roller arm retaining fasteners 106. The generic roller arm 104 further includes a substantially square through hole 510. The roller arm 104 may come in many different shapes and sizes. For example, three different roller arm embodiments are illustrated in FIGS. 18-20, and will be discussed in more detail later in the disclosure.

Figure 6A:
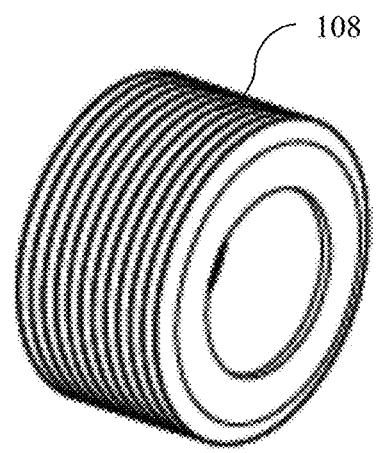
FIGS. 6A-C depict a schematic isometric, front, and cross-sectional view of a pulley.
Figure 6B:
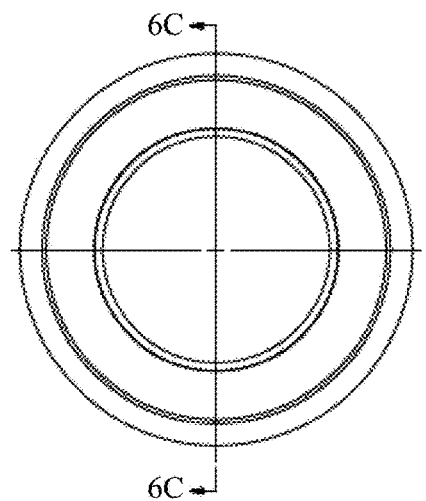
Figure 6C:
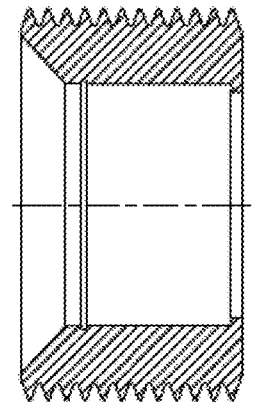

FIGS. 6A-6C illustrate a generic pulley 108. FIGS. 6A-6C merely illustrate a generic pulley 108 because the pulley 108 may come in many different shapes and sizes. For example, ten different pulley embodiments are illustrated in FIGS. 21-30, and will be discussed in more detail later in the disclosure.

Figure 7A:
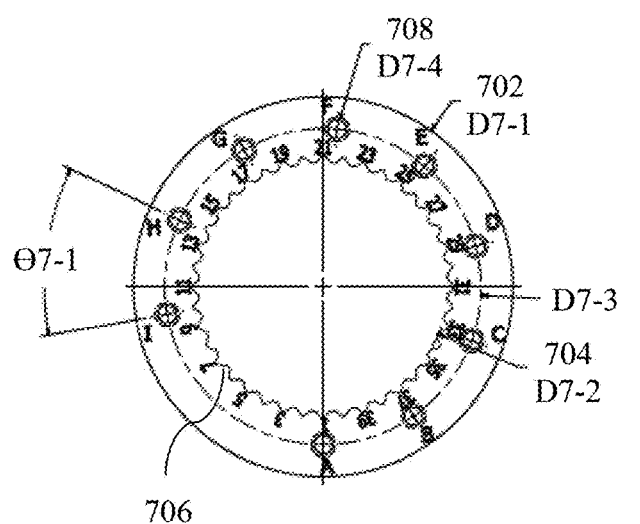
FIGS. 7A-B depict a front and side view of the splined index plate.
Figure 7B:
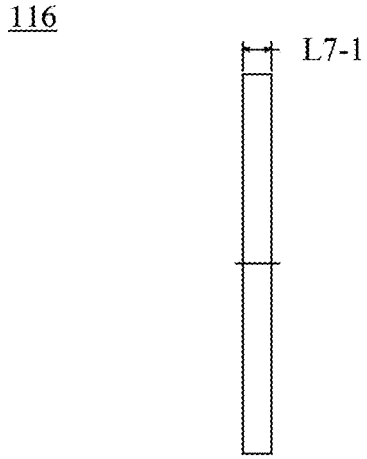

FIGS. 7A-7B illustrate the splined index plate 116. The splined index plate 116 is ring-shaped projected longitudinally with a length of L7-1. The splined index plate 116 has an outer circumference 702 and inner circumference 704. The outer circumference has a diameter of D7-1; the inner circumference has a diameter D7-2. The diameter D7-1 of the outer circumference 702 is greater than the diameter D7-2 of the inner circumference 704. The inner circumference includes a plurality of teeth 706. The teeth 706 on the splined index plate 116 correspond and are engageable with the plurality of teeth 304 on the splined torsion shaft 124. In one embodiment, shown in FIG. 7A, the splined index plate 116 may have forty teeth that correspond with the forty teeth of the splined torsion shaft 124 as shown in one embodiment illustrated in FIG. 3A. However, the present disclosure is not so limited, and the number of teeth may be greater than or less than forty.

The splined index plate 116 further includes a plurality of threaded holes 708 that align circumferentially along the splined index plate 116 between the outer circumference 702 and the inner circumference 704. The diameter D7-3 of the circumference upon which the plurality of threaded holes 708 are aligned is greater than the inner circumference 704 and less than the outer circumference 702. Each threaded holes 708 has a diameter of D7-4. In one embodiment shown in FIG. 7A, the splined index plate 116 may have nine threaded holes 708. In one embodiment, the splined index plate 116 may be labeled "A" through "I" for each threaded holes 708. The labels are engraved into the splined index plate 116, although they may be labeled in alternative ways such as etching, or the like. The labeling may be used to determine where to place the index plate locating location pin when building the modular tensioner system. In one embodiment, the threaded holes 708 may be equally spaced from each other at an angle of θ7-1°, expect for the space between "A" and "I". This non-limiting embodiment combination provides one degree increments. Additional teeth 706 and threaded holes 708 may be added to offer higher resolution, for example, ½ degree increments. Additionally, there may be other mounting strategies used to accommodate other mounting configurations.

FIGS. 8 and 9 illustrate the different variations of the index plate locating pin 118. The index plate locating pin 118 may come in two different embodiments. In FIGS. 8A-8B illustrate a first index plate locating pin, LP-1. FIGS. 9A-9B illustrate a second index plate locating pin, LP-2. As the two index plate locating pins LP-1 and LP-2 are similar, the index plate locating pin, LP-1 will be described in detail. The index plate locating pins may be made of AISI 1018 cold drawn steel or any other suitable material.

FIG. 8A illustrates a head 802 of the first index plate locating pin LP-1. The head 802 has a diameter, D8-1. The diameter D8-1 may be between 0.4 and 0.5 inches, but more preferably between 0.44 and 0.46 inches. The head 802 further includes a hex socket 804. The hex socket 804 is recessed portion in the head, with a predetermined depth or length. The hex socket has six sides; however, the disclosure is not so limited. The hex socket is merely the drive design, and a number of different types of designs may also be used, such as slot, Phillips, Robertson, Double-square, or the like.

FIG. 8B illustrates a cross-section view of the first index plate locating pin LP-1 according to the cross-section line 8A in FIG. 8A. The first index plate locating pin has a characteristic length L8-1. The head has a length L8-2. The characteristic length L8-1 may be between 0.45 and 0.55 inches, but more preferably between 0.47 and 0.49 inches. The head length L8-2 may be between 0.22 and 0.26 inches, but more preferably between 0.24 and 0.25 inches. The ratio between the characteristic length L8-1 and the head length L8-2 may be between 1.73 and 2.5, but more preferably between 1.95 and 2.05. The shank 806 of the screw is threaded, and allows the screw to screw into the corresponding threaded holes 708 on the splined index plate 116. The ratio between the characteristic length L8-1 and the head diameter D8-1 may be between 0.9 and 1.375, but more preferably between 1.02 and 1.11.

The second index plate locating pin LP-2 is substantially similar to the first index plate locating pin LP-1. A difference between the two pins is the head diameter. The head diameter of the second index plate locating pin LP-2 is between 0.25 and 0.35 inches, but more preferably between 0.29 and 0.31 inches. The ratio between the characteristic length L9-1 and the head diameter D9-1 may be between 1.28 and 2.2, but more preferably between 1.34 and 1.96.

The index plate locating pin 118 may be placed in any of the nine different threaded holes 708 on the splined index plate 116. Through the combination of rotating the splined index plate, and placing the index plate locating pin in one of the nine threaded holes 708, the index plate locating pin may be placed anywhere within a 360° location on the splined index plate 116. This allows a full range of orientation. Of the tensioners on the market, the tensioners have one of these two different head sizes.

Figure 10A:
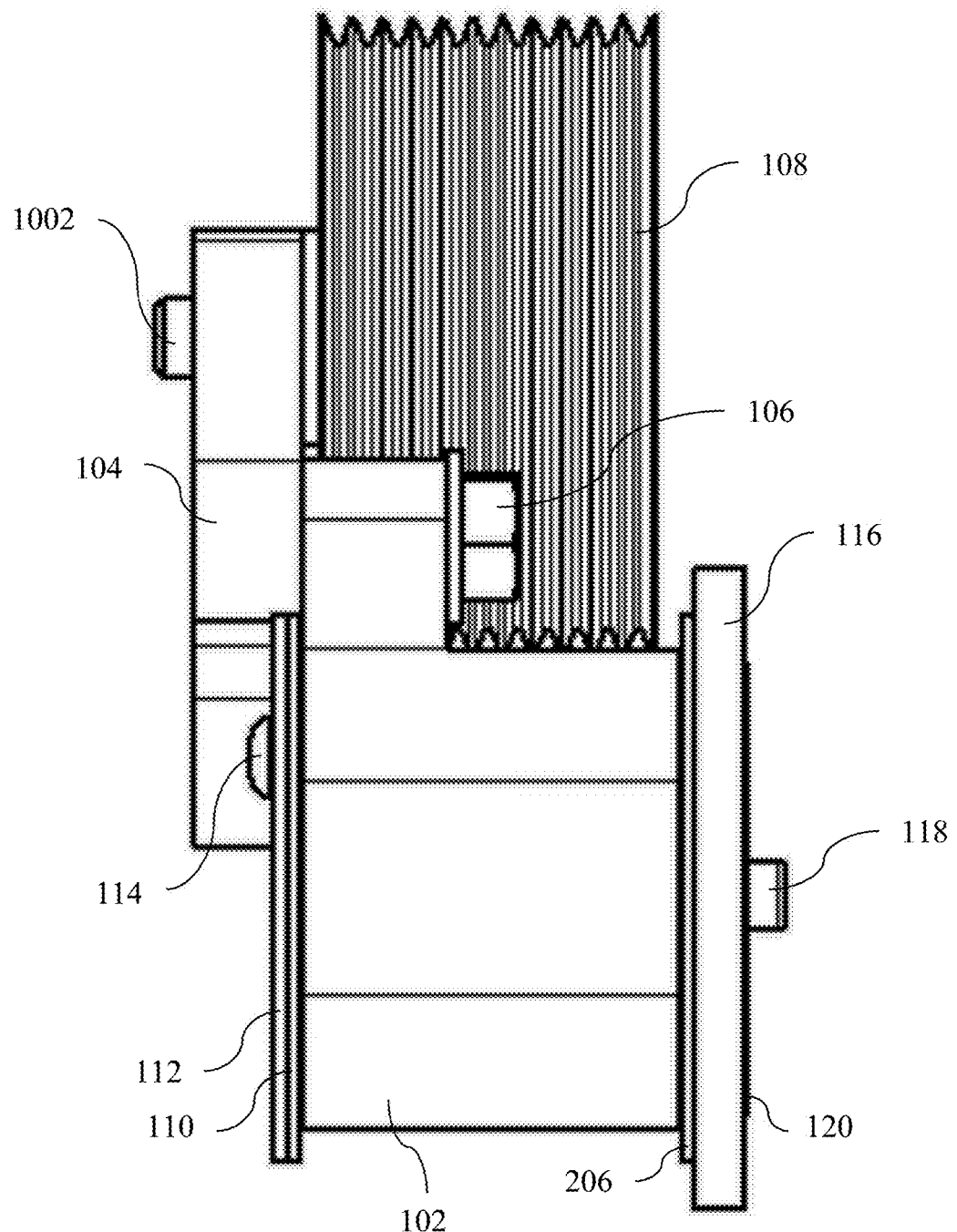
FIGS. 10A-C depict a schematic side, front, and cross-sectional view of one embodiment of the modular tensioner system.
Figure 10B:
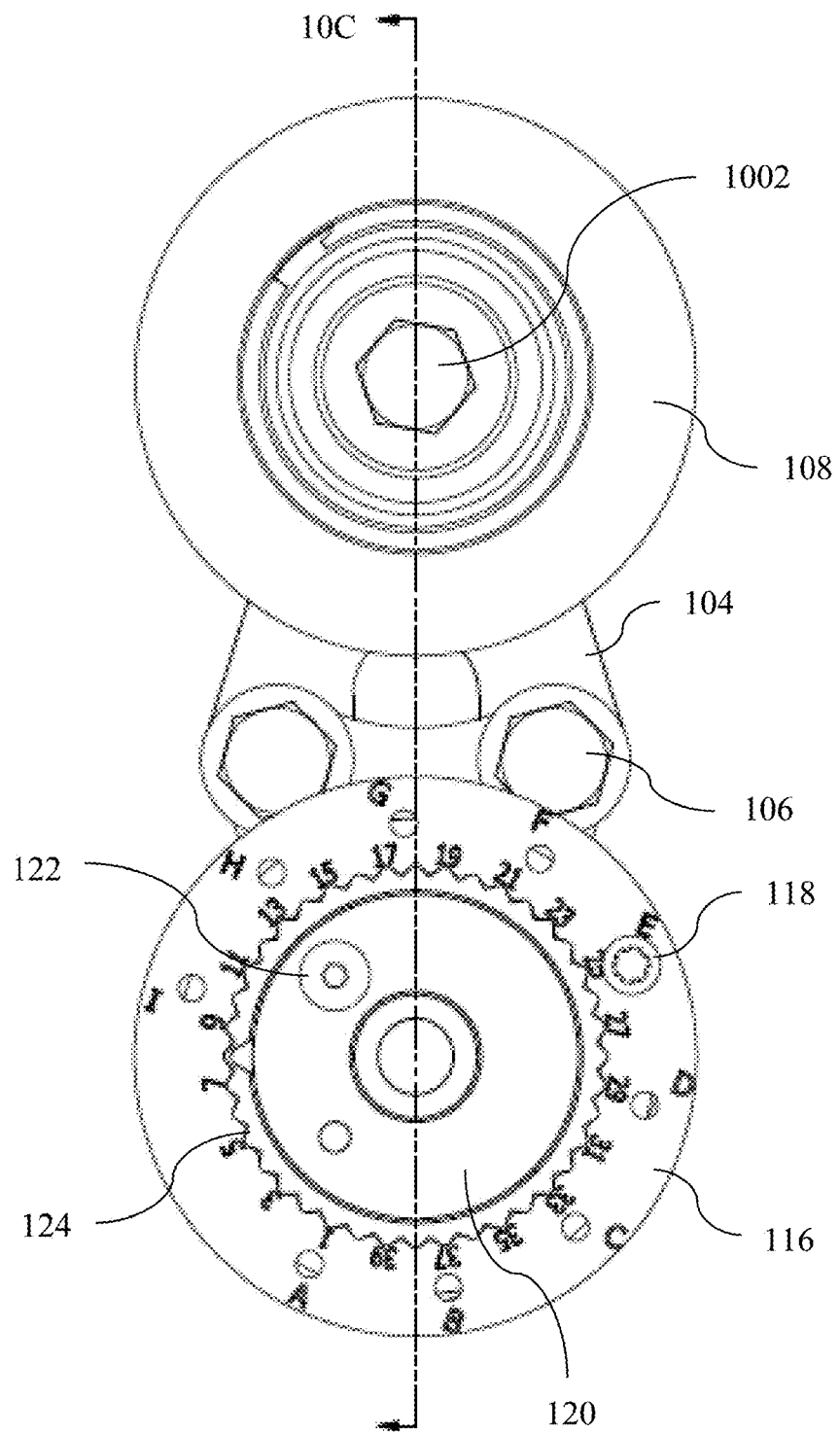
Figure 10C:
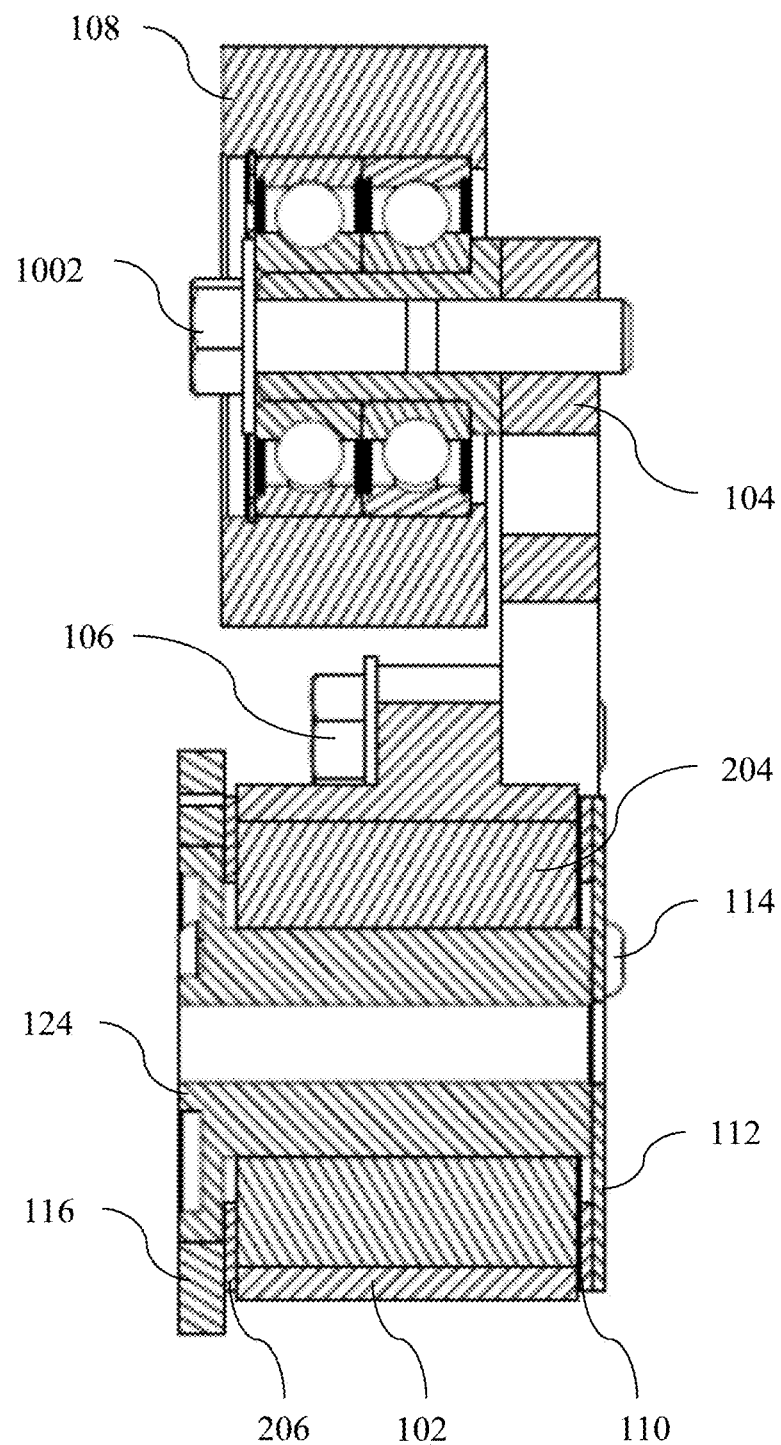

FIG. 10A illustrates a side view of one embodiment of an assembled modular tensioner using the components of the modular tensioner system 100. From this view, a shoulder spacer 1002 is illustrated. The shoulder spacer 1002 may fasten the arm to the pulley. The fastener may be a bolt, screw, or the like. The shoulder spacer 1002 helps determine which pulley component is used to assemble a replacement tensioner. The shoulder spacer 1002 may keep the pulley 108 tight, and acts as a spacer to keep the pulley 108 a predetermined distance from the arm 104. FIG. 10B illustrates a front view of the assembled modular tensioner system. FIG. 10C illustrates a cross-sectional view of the assembled modular tensioner system 100 according to cross section line 10C in FIG. 10B.

FIG. 11A-C illustrate the shoulder spacer 1002 that fastens the pulley 108 to the roller arm 104.

Figure 12:
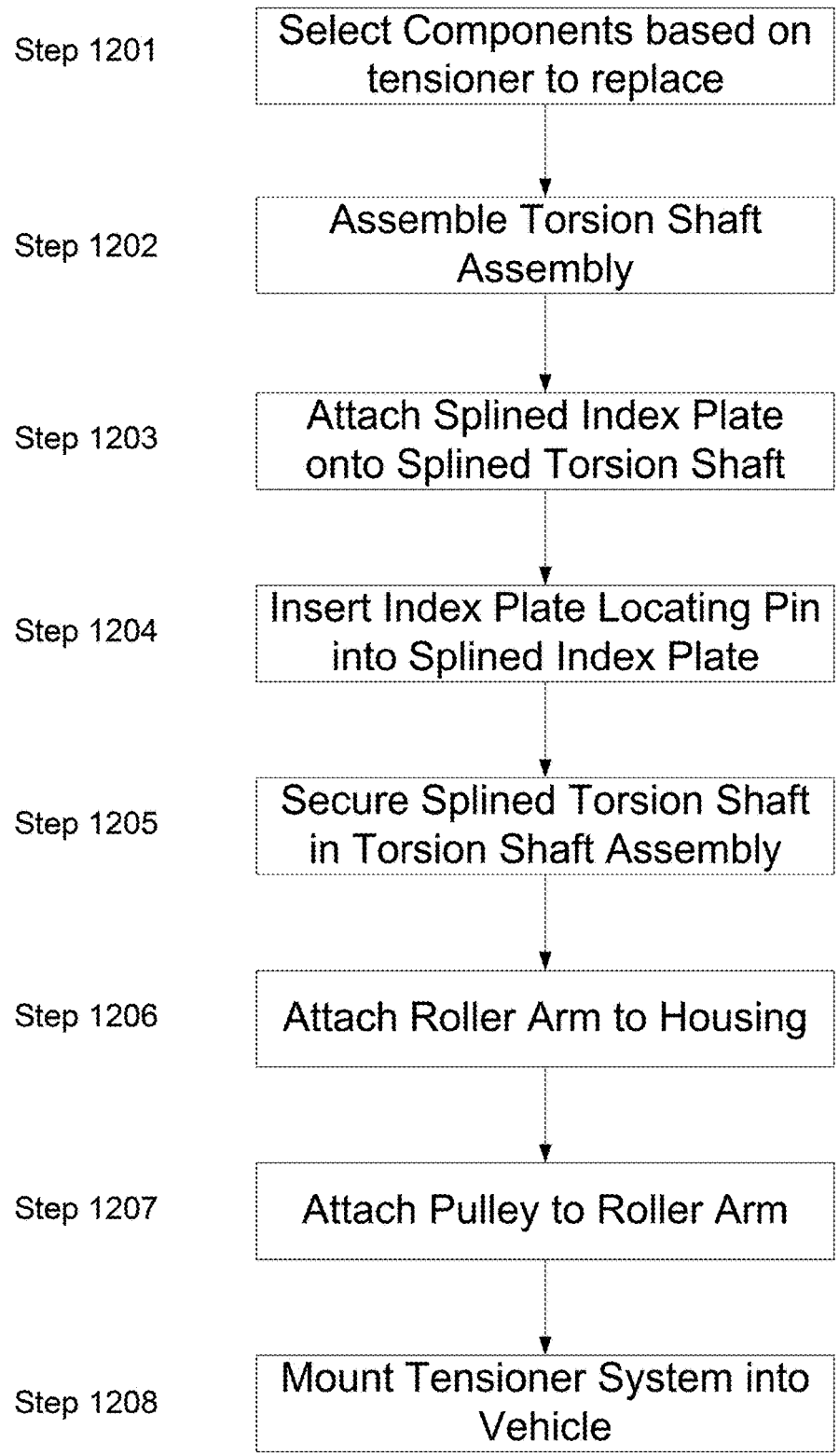
FIG. 12 depicts a flow chart used in an exemplary embodiment for assembling a modular tensioner system.

FIG. 12 depicts an exemplary embodiment of how to assemble a replacement modular tensioner system. Step 1201 selects components based on the make and model of the tensioner to be replaced. The selection of the components may be based on the tensioner currently in use or measurements taken of the current tensioner. FIG. 13 describes in more detail the process of selecting the replacement components for the replacement tensioner.

Step 1202 assembles the torsion shaft assembly 102. The torsion shaft assembly was described previously, see FIGS. 2A-2D. The torsion shaft assembly 102 may be assembled by inserting the plurality of springs 204 into each corner of the housing 202. The springs 204 may be placed in alternative locations in the housing 202 in order to apply the proper amount of force against the splined torsion shaft 124. The housing 202 may be selected from a plurality of housing 202 variations available to create a modular tensioner system 100. The splined torsion shaft 124 may be inserted into the housing 202 along with the plurality of springs 204 with the anti-friction disk 206 sandwiched between the splined torsion shaft 124 and the housing 202.

Step 1203 attaches the splined index plate 116 onto the splined torsion shaft 124. The plurality of teeth 706 on the splined index plate 11 correspond with the plurality of teeth 304 on the splined torsion shaft 124. The number of teeth is dependent on the type of resolution required to properly place the modular tensioner system 100 on the engine.

Step 1204 inserts the index plate locating pin 118 into one of the plurality of threaded through holes 708 on the splined index plate 116. The index plate locating pin 118 may be selected from a plurality of index plate locating pin 118 variations available to create a modular tensioner system. The location of the index plate locating pin 118 on the splined index plate 116 may be anywhere within the 360° orientation of the splined index plate 116.

Step 1205 secures the splined torsion shaft 124 in the torsion shaft assembly 102. The side of the housing with splined index plate 116 attached to the splined torsion shaft 124, an index plate retainer 120 is secured splined torsion shaft 124 by way of the index plate retainer screw 122 in the threaded hole 316 found within the recessed portion 308 of the splined torsion shaft 124. The index plate retainer 120 secures the splined torsion shaft 124 and the splined index plate 116.

Step 1206 attaches the housing 202 to the roller arm 104. The housing 202 is attached to the roller arm 104 at the attachment extension 402 by way of the roller arm retaining fasteners 106. The roller arm 104 may be selected from a plurality of roller arm variations available to create a modular tensioner system.

Step 1207 attaches the pulley 108 to the roller arm 104 by way the shoulder spacer 1002. The pulley 108 may be selected from a plurality of pulley 108 variations available to create a modular tensioner system. Step 1208 mounts the replacement modular tensioner system into the vehicle.

The steps discussed in FIG. 12 are directed to a non-limiting embodiment. The steps do not need to be performed in any particular order, and the modular tensioner may be assembled in various manners.

While assembling the modular tensioner system, the user needs to select various replacement components. Several of the components have multiple variations to allow the user to create a tensioner that is commercially available. For example, the housing 202 of the torsion shaft assembly 102, the roller arm 104, the pulley 108, and the index plate locating pin 118 all may have multiple variations from which the user may select.

If the type and model of the tensioner is known, the user may use a chart to select the various components to assemble the replace tensioner. If the type and model of the tensioner is unknown, the user may take measurements of the existing tensioner and the engine block to determine which components need to be selected to assembly a tensioner may function in the vehicle.

To determine which replacement components are needed to assemble a replacement tensioner, FIG. 13 describe an exemplary embodiment of the method or process to determine the components.

Step 1301 describes determining the current tensioner's part number, i.e., serial number, or taking measurements of the current tensioner. If the tensioner part number is known, the replacement component parts are predetermined. If the tensioner part number is not known, measurements may be taken to determine which replacement components parts should be selected in order to assemble a replacement tensioner. Possible measurements that may be taken may include the roller arm height, roller arm height, pulley centerline, pulley centerline combined, pulley diameter, pulley diameter combined, pulley length, pulley length combined, index plate locating pin head diameter, index plate locating pin length, pin bolt diameter, the angle of the pin from a reference or home position, distance to the first belt groove of a grooved pulley, pulley edge measurement, mounting hole diameter, pulley inner edge, pulley outer edge, pulley theoretical inner edge, pulley theoretical outer edge, inner edge delta, max angle of deflection, and spring force, and the like.

A combination of these various measurement may allow the user to determine which variations of the various components would be useful is creating a replacement modular tensioner system. In step 1302, the user selects the components based on the measurements taken. Not every measurement needs to be taken to determine which components to use, but a combination of the measurements would enable the user to select the correct components. For example, in a non-limiting embodiment, measurements may be taken and inputted into a database, which will instruct the user which measurement to take next. For example, a pulley diameter may be taken and inputted into the database. The database may prompt for the next measurement, for example, arm length. After a sufficient amount of measurements have been taken, the required components are determined to build a replacement tensioner.

FIGS. 14-30 illustrate multiple variations of some of the interchangeable components of the modular tensioner system 100. The drawings are to scale. Multiple components have multiple variations. As discussed above, various embodiments of the housing of the torsion shaft assembly 102, the roller arm 104 and the pulley 108 may be used in order to achieve multiple tensioner arrangements. The next part of the disclosure will discuss possible variations of these components that may be used to create a modular tensioner system, however the present disclosure is not meant to be limited to only the embodiments disclosed.

FIGS. 14-17 illustrate multiple housing variations for the torsion shaft assembly 102. FIGS. 4A-4D briefly described the generic housing, wherein each housing includes the attachment extension 402, the housing body 404, the plurality of attachment extension through holes 406, and the housing body through hole 408.

Referring to FIGS. 14A-14D, a first housing H-1 will be described. The first housing H-1 may be made of aluminum, or any other suitable material. FIG. 14B illustrates that the first housing H-1 fits within a characteristic diameter, D14-1. The diameter D14-1 may be between 3 and 4 inches, but more preferably between 3.45 and 3.55 inches. FIG. 14C illustrates the first housing H-1 with a characteristic length L14-1. The characteristic length L14-1 may be between 1.5 and 2.5 inches, but more preferably between 1.65 and 1.85 inches. An attachment extension projects 1402 from the housing body 1404. The attachment extension 1402 has a length L14-2. The length L14-2 of the attachment extension 1402 may be between 0.5 and 0.75 inches, but more preferably between 0.55 and 0.7 inches. The ratio of the characteristic length L14-1 and the attachment extension length L14-2 may be between 2 and 5, but more preferably between 2.7 and 3.4. The housing body 1404 has a first end 1410 and a second end 1412. The attachment extension 1402 is located between the first end 1410 and the second end 1412; it is preferably located closer to the second end 1412 than the first end 1410. The attachment extension 1402 is located from the first end 1410 at a length of L14-3. The length L14-3 of the attachment extension 1402 from the first end 1410 may be between 0.5 and 0.9 inches, but more preferably between 0.6 and 0.7 inches. As seen in FIG. 14D, the attachment extension 1402 has two through holes 1406 that allow the roller arm retaining fasteners 106 to secure the roller arm 104 to the attachment extension 1402. The housing body 1404 includes a substantially square through hole 1408 for accommodating the rubber springs 204 and the splined torsion shaft 124. The height H14-1 of the substantially square through hole 1408 may be between 1.75 and 1.95 inches. Each of the interiors corners of the housing body through hole 1408 may be filleted. The exterior corners of the housing body 1404 may be rounded.

Referring to FIGS. 15A-15D, a second housing H-2 will be described. The second housing H-2 may be made of aluminum, or any other suitable material. FIG. 15B illustrates that the second housing H-2 fits within a characteristic diameter, D15-1. The diameter D15-1 is between 3 and 4 inches, but more preferably between 3.45 and 3.55 inches. FIG. 15C illustrates the second housing H-2 with a characteristic length L15-1. The characteristic length L15-1 may be between 1.5 and 2.5 inches, but more preferably between 1.65 and 1.85 inches. An attachment extension 1502 projects from the housing body 1504. The attachment extension 1502 has a length L15-2. The length L15-2 of the attachment extension 1502 may be between 0.5 and 0.75 inches, but more preferably between 0.55 and 0.7 inches. The ratio of the characteristic length L15-1 and the attachment extension length L15-2 may be between 2 and 5, but more preferably between 2.7 and 3.4. The housing body 1504 has a first end 1510 and a second end 1512. The attachment extension may be flush with the second end 1512. As seen in FIG. 15D, the attachment extension 1502 has two through holes 1506 that allow the roller arm retaining fasteners 106 to secure the roller arm 104 to the attachment extension 1502. The housing body 1504 includes a substantially square through hole 1508 for accommodating the rubber springs 204 and the splined torsion shaft 124. The height H15-1 of the substantially square through hole 1508 may be between 1.75 and 1.95 inches. Each of the interiors corners of the housing body through hole 1508 may be filleted. The exterior corners of the housing body 1504 may be rounded.

Referring to FIGS. 16A-16D, a third housing H-3 will be described. The third housing H-3 may be made of aluminum, or any other suitable material. FIG. 16B illustrates that the third housing H-3 fits within a characteristic diameter, D16-1. The diameter D16-1 is between 3 and 4 inches, but more preferably between 3.45 and 3.55 inches. FIG. 16C illustrates the third housing H-3 with a characteristic length L16-1. The characteristic length L16-1 may be between 1.5 and 2.5 inches, but more preferably between 1.65 and 1.85 inches. An attachment extension projects 1602 from the housing body 1604. The attachment extension 1602 has a length L16-2. The length L16-2 of the attachment extension 1602 may be between 0.5 and 0.75 inches, but more preferably between 0.55 and 0.7 inches. The ratio of the characteristic length L16-1 and the attachment extension length L16-2 may be between 2 and 5, but more preferably between 2.7 and 3.4. The housing body 1604 has a first end 1610 and a second end 1612. A small portion of the attachment extension 1602 extends beyond the second end 1612, although the majority of the attachment extension 1602 does not extend beyond the second end 1612. For example, the attachment extension 1602 may extend between 0.01 and 0.3 inches, but more preferably between 0.04 and 0.08 inches. As seen in FIG. 16D, the attachment extension 1602 has two through holes 1606 that allow the roller arm retaining fasteners 106 to secure the roller arm 104 to the attachment extension 1602. The housing body 1604 includes a substantially square through hole 1608 for accommodating the rubber springs 204 and the splined torsion shaft 124. The height H16-1 of the substantially square through hole 1608 may be between 1.75 and 1.95 inches. Each of the interiors corners of the housing body through hole 1608 may be filleted. The exterior corners of the housing body 1604 may be rounded.

Referring to FIGS. 17A-17D, a fourth housing H-4 will be described. The fourth housing H-4 may be made of aluminum, or any other suitable material. FIG. 17B illustrates that the fourth housing H-4 fits within a characteristic diameter, D17-1. The diameter is between 3 and 4 inches, but more preferably between 3.45 and 3.55 inches. FIG. 17C illustrates the fourth housing H-4 with a characteristic length L17-1. The characteristic length L17-1 may be between 1.5 and 2.5 inches, but more preferably between 1.65 and 1.85 inches. An attachment extension projects 1702 from the housing body 1704. The attachment extension 1702 has a length L17-2. The length L17-2 of the attachment extension 1702 may be between 0.5 and 0.75 inches, but more preferably between 0.55 and 0.7 inches. The ratio of the characteristic length L17-1 and the attachment extension length L17-2 may be between 2 and 5, but more preferably between 2.7 and 3.4. The housing body 1704 has a first end 1710 and a second end 1712. A majority of the attachment extension 1702 extends beyond the second end 1712, although a small portion of the attachment extension 1702 does not extend beyond the second end 1712. For example, the attachment extension 1702 may extend between 0.35 and 0.7 inches beyond the second end 1712, but more preferably between 0.36 and 0.45 inches. As seen in FIG. 17D, the attachment extension 1702 has two through holes 1706 that allow the roller arm retaining fasteners 106 to secure the roller arm 104 to the attachment extension 1702. The housing body 1704 includes a substantially square through hole 1708 for accommodating the rubber springs 204 and the splined torsion shaft 124. The height H17-1 of the substantially square through hole 1708 may be between 1.75 and 1.95 inches. Each of the interiors corners of the housing body through hole 1708 may be filleted. The exterior corners of the housing body 1704 may be rounded.

FIGS. 18-20 illustrate multiple roller arm variations of the modular tensioner system 100. FIGS. 5A-5B briefly described the generic roller arm, wherein each roller arm includes the first end 502 with the threaded through hole 506, the second end 504 with two arm wherein each arm has a threaded through hole 508, and a substantially square through hole 510.

Referring to FIGS. 18A-C, a first roller arm A-1 will be described. The first roller arm A-1 may be made of aluminum of any other suitable material. As illustrated in FIG. 18B, the first roller arm A-1 has a characteristic height H18-1. The height H18-1 may be between 2.9 and 3.1 inches, but more preferably between 2.92 and 3.03 inches. The first roller arm A-1 has a first end 1802 and a second end 1804. The first end may have a threaded through hole 1806 that enables the pulley 108 to attach to the first end 1802 of the first roller arm A-1. The second end 1804 may have two identical arms that extend and are separated by a recess 1812. The recess may have an arc shape 1816 toward the center of the first roller arm A-1. The distance between the center of the arc shape and the first end through hole 1806 is H18-3. The height H18-3 may be between 1.8 to 2.2 inches. The ratio between the height H18-1 and H18-3 may be between 1.32 to 1.72. Each arm may have a threaded through hole 1808 that corresponds and is the same size as the attachment extension through holes 406. The roller arm retainer fasteners 106 are threaded through the second end threaded through holes 1808 of the first roller arm A-1 and the attachment extension 402. The distance between the threaded through holes 1808 is W18-1. The width W18-1 may be between 1.35 and 1.65 inches, but more preferably 1.45 to 1.55 inches. The distance between the first end through hole 1806 and the second end through holes 1808 is H18-2. The ratio between the height H18-2 and the width W18-1 may be between 1.5 and 2. The ratio between the characteristic height H18-1 and the distance between the through holes H18-2 may be between 1.1 and 1.5. The first roller arm A-1 may be symmetrical about the center axis 1814 of the first end threaded through hole 1806. The sides of the first roller arm A-1 are angled. The angle between the sides of the first roller arm is θ18-1. The angle may be between 32 and 36 degrees. However, the angle may vary as long as the first roller arm A-1 clears other nearby components and have sufficient structural strength. The first roller arm A-1 further includes a substantially square through hole 1810 located along the center line 1814 of the first end threaded through hole 1806. The side length of the substantially square through hole 1810 is between 0.40 to 0.60 inches, but more preferably between 0.50 to 0.54 inches. The through hole 1810 does not have to be square; it may also be rectangular, circular or the like. The square through hole 1810 provides a manner to attach a bar or wrench and be able to gain mechanical advantage to move the tensioner into position. The substantially square through hole 1810 may be located between the first end threaded through hole 1806 and the second end threaded through holes 1808, but is closer to the first end threaded through hole 1806 than to the second end threaded through holes 1808. All the edges of the first roller arm A-1 may be rounded. FIG. 18C illustrates the characteristic height H18-1 of the first roller arm A-1.

Referring to FIGS. 19A-C, a second roller arm A-2 will be described. The second roller arm A-2 may be made of aluminum of any other suitable material. As illustrated in FIG. 19B, the second roller arm A-2 has a characteristic height H19-1. The height H19-1 is between 2.25 and 2.45 inches, but more preferably between 2.33 and 2.41 inches. The second roller arm A-2 has a first end 1902 and a second end 1904. The first end may have a substantially square through hole 1910. The side length of the substantially square through hole 1910 is between 0.40 to 0.60 inches, but more preferably between 0.50 to 0.54 inches. The through 1910 hole does not have to be square; it may also be rectangular, circular or any other shape. The square through hole 1910 provides a manner to attach a bar or wrench and be able to gain mechanical advantage to move the tensioner into position. The second end has two identical arms that extend from the first end 1902 and that are separated by a recess 1912. The recess may have an arc shape 1916 toward the center of the second roller arm A-2. The distance between the center of the arc shape and the first end through hole 1906 is H19-3. The height H19-3 may be between 0.5 and 0.7 inches. The ratio between the height H19-1 and H19-3 may be between 3.21 to 4.9. Each arm may have a threaded through hole 1908 that corresponds and is the same size as the attachment extension through holes 406. The roller arm retainer fasteners 106 are threaded through the second end threaded through holes 1908 of the second roller arm A-2 and the attachment extension 402. A threaded through hole 1906 is located between the substantially square through hole and the second end threaded through holes 1908. The threaded through hole 1906 enables the pulley 108 to attach to the first end 1902 of the second roller arm A-2. The distance between the threaded through holes 1908 is W19-1. The width W19-1 may be between 1.35 and 1.65 inches, but more preferably 1.45 to 1.55 inches. The distance between the first end through hole 1906 and the second end through holes 1908 is H19-2. The ratio between the height H19-2 and the width W19-1 may be between 0.25 and 0.5. The ratio between the characteristic height H19-1 and the distance between the through holes H19-2 may be between 3.5 and 4. The second roller arm A-2 may be symmetrical about the center axis 1914 of the first end threaded through hole 1906. The sides of the first roller arm A-1 are angled. The angle between the sides of the first roller arm is θ19-1. The angle may be between 40 and 50 degrees. However, the angle may vary as long as the second roller arm A-2 clears other nearby components and have sufficient structural strength. All the edges of the first roller arm A-1 may be rounded. FIG. 19C illustrates the characteristic height H19-1 of the second roller arm A-2.

Referring to FIGS. 20A-C, a third roller arm A-3 will be described. The third roller arm A-3 may be made of aluminum of any other suitable material. As illustrated in FIG. 20B, the third roller arm A-3 has a characteristic height H20-1. The height H20-1 is between 3.1 and 3.4 inches, but more preferably between 3.2 and 3.3 inches. The third roller arm A-3 has a first end 2002 and a second end 2004. The first end may have a threaded through hole 2006 that enables the pulley 108 to attach to the first end 2002 of the third roller arm A-3. The second end may have two identical arms that extend and are separated by a recess 2012. The recess may have an arc shape 2016 toward the center of the third roller arm A-3. The distance between the center of the arc shape and the first end through hole 2006 is H20-3. The height H20-3 may be between 2.15 to 2.55 inches. The ratio between the height H20-1 and H20-3 may be between 1.21 to 1.58. Each arm may have a threaded through hole 2008 that corresponds and is the same size as the attachment extension through holes 406. The roller arm retainer fasteners 106 may be threaded through the second end threaded through holes 2008 of the third roller arm A-3 and the attachment extension 402. The distance between the threaded through holes 2008 is W20-1. The width W20-1 may be between 1.35 and 1.65 inches, but more preferably 1.45 to 1.55 inches. The distance between the first end through hole 2006 and the second end through holes 2008 is H20-2. The ratio between the height H20-2 and the width W20-1 may be between 1.75 and 2.25. The ratio between the characteristic height H20-1 and the distance between the through holes H20-2 may be between 3.5 and 4. The third roller arm A-3 may be symmetrical about the center axis 2014 of the first end threaded through hole 2006. The sides of the third roller arm A-3 are angled. The angle between the sides of the first roller arm is θ20-1. The angle may be between 25 and 32 degrees. However, the angle may vary as long as the third roller arm A-3 clears other nearby components and have sufficient structural strength. The first roller arm further includes a substantially square through hole 2010 located along the center line 2014 of the first end threaded through hole 2006. The side length of the substantially square through hole 2010 is between 0.4 to 0.6 inches, but more preferably between 0.50 to 0.54 inches. The through hole does not have to be square; it may also be rectangular, circular or any other shape. The square through hole 2010 provides a manner to attach a bar or wrench and be able to gain mechanical advantage to move the tensioner into position. The substantially square through hole 2010 is located between the first end threaded through hole 2006 and the second end threaded through holes 2008, but may be closer to the first end threaded through hole 2006 than to the second end threaded through holes 2008. All the edges of the first roller arm A-1 are rounded. FIG. 20C illustrates the characteristic height H20-1 of the third roller arm A-3.

FIGS. 21-30 illustrate multiple pulley variations of the modular tensioner system 100. FIGS. 6A-6C briefly describe the generic pulley. A belt (not shown) wraps around the pulley, and the tensioner system applies tension to the belt. Each pulley variation will now be explained in detail.

FIGS. 21A-21C illustrate a first pulley P-1, which may be a circular bar with a characteristic diameter D21-1 and length L21-1. FIG. 21C is a cross-sectional view of the first pulley P-1 according to the cross-section line 21C in FIG. 21B. The first pulley P-1 may be made of AISI 1215, 1018, 1045 steel or any other suitable material. The characteristic diameter D21-1 may be between 2.75 and 3.25 inches, but more preferably between 2.9 and 3.1 inches. The characteristic length L21-1 may be between 1.25 and 1.45 inches. The first pulley P-1 has a through hole 2102 which extends through the entire length L21-1 of the first pulley P-1. The first pulley P-1 has a first end 2104 and a second end 2106. The through hole 2102 on the first end has a diameter of D21-2. The diameter D21-2 of the through hole 2102 may be constant for a majority of the through hole 2102, or a length of L21-2, expect for a circular channel 2108 that is located a length of L21-4 from the first end 2104. The circular channel 2108 may be used for a snap ring to allow rotation but prevent lateral movement. The diameter of the through hole 2102 may step down to a smaller diameter of D21-3 near the second end 2106 of the first pulley P-1. The diameter D21-3 of the through hole 2102 may extend for a length of L21-3 from the second end 2106. The ratio of the characteristic diameter D21-1 to the diameter D21-2 of the through hole 2102 on the first end 2104 may be between 1 to 3. The ratio of the diameter D21-2 of the through hole 2102 at the first end 2104 to the diameter D21-3 of the through hole 2102 to the second end 2106 may be between 1 and 1.25. The ratio of the characteristic length L21-1 to the length L21-2 may be between 1 and 1.25.

Figure 22A:
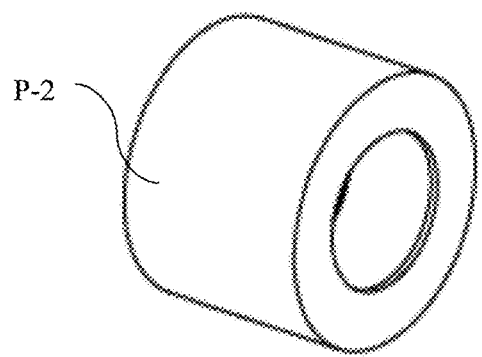
FIGS. 22A-C depict respectively a schematic isometric, front, and cross-sectional view of a second pulley.
Figures 22B, 22C:
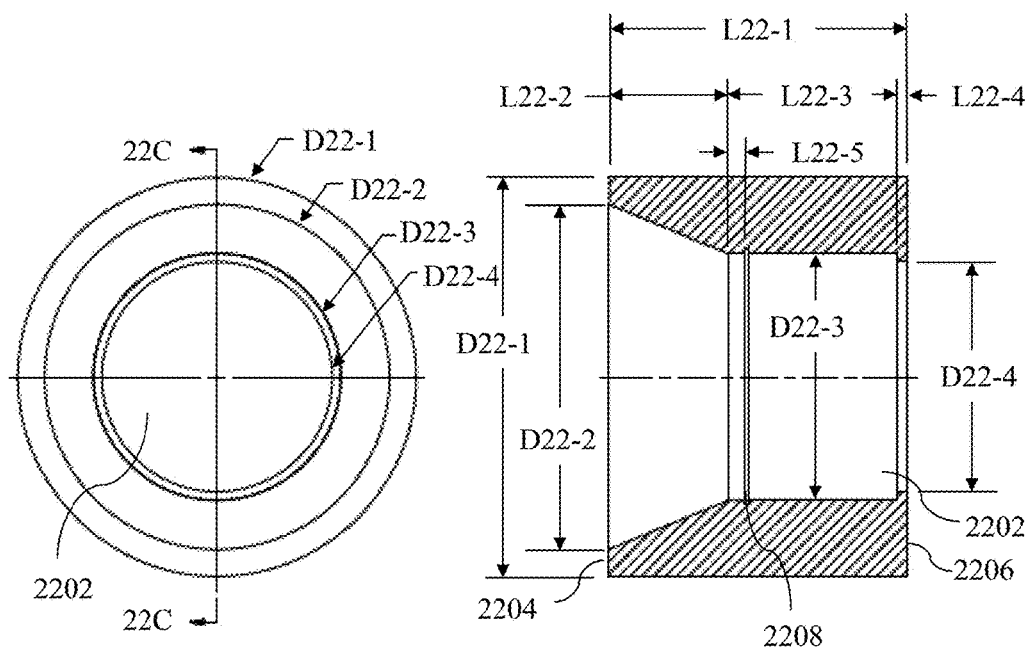

FIGS. 22A-22C illustrate a second pulley P-2, which may be a circular bar with a characteristic diameter D22-1 and length L22-1. FIG. 22C is a cross-sectional view of the second pulley P-2 according to the cross-section line 22C in FIG. 22B. The second pulley P-2 may be made of AISI 1215, 1018, 1045 steel or any other suitable material. The characteristic diameter D22-1 may be between 2.75 and 3.25 inches, but more preferably between 2.9 and 3.1 inches. The characteristic length L22-1 may be between 2.15 and 2.35 inches. The second pulley P-2 has a through hole 2202 which extends through the entire length L22-1 of the second pulley P-2. The second pulley has a first end 2204 and a second end 2206. The though hole 2202 on the first end 2204 has a diameter of D22-2. The through hole 2202 may angle inward toward the center of the through hole 2202 at a fixed angle for a predetermined length L22-2, and then continues at a constant diameter, or inner diameter D22-3. The inner diameter D22-3 may extend for a length of L22-3, except for a circular channel 2208 that is located a length of L22-5 from the beginning of the inner diameter D22-3, until it comes close to the second end 2206. The circular channel 2208 may be used for a snap ring to allow rotation but prevent lateral movement. The diameter of the through hole 2202 may step down to a smaller diameter of D22-3 near the second end 2206 of the second pulley P-2. The diameter D22-3 extends a length of L22-4 from the second end 2206. The ratio of the characteristic diameter D22-1 to the diameter D22-2 of the through hole 2202 on the first end 2204 may be between 1 to 1.5. The ratio of the diameter D22-2 of the through hole 2202 at the first end 2204 to the inner diameter D22-3 may be between 1 and 1.5. The ratio between the inner diameter D22-3 and the diameter D22-4 of the through hole 2202 at the second end 2206 may be 1 and 1.25. The ratio of the characteristic length L22-1 to the length L22-3 may be between 1.5 and 2.

FIGS. 23A-23C illustrate a third pulley P-3, which may be a circular bar with a characteristic diameter D23-1 and length L23-1. FIG. 23C is a cross-sectional view of the third pulley P-3 according to the cross-section line 23C in FIG. 23B. The third pulley P-3 may be made of AISI 1215, 1018, 1045 steel or any other suitable material. The characteristic diameter D23-1 may be between 3.25 and 3.75 inches, but more preferably between 3.3 and 3.5 inches. The characteristic length L23-1 may be between 1.45 and 1.65 inches. The third pulley P-3 has a through hole 2302 which may extend through the entire length L23-1 of the third pulley P-3. The third pulley has a first end 2304 and a second end 2306. The though hole 2302 on the first end 2304 has a diameter of D23-2. The through hole 2302 may angle inward toward the center of the through hole 2302 at a fixed angle for a predetermined length L23-2, and then continues at a constant diameter, or inner diameter D23-3. The angle of the third pulley P-3 is greater than the angle of the second pulley P-2. The inner diameter D23-3 extends for a length of L23-3, except for a circular channel 2308 that is located a length of L23-5 from the beginning of the inner diameter D23-3, until it comes close to the second end 2306. The circular channel 2308 may be used for a snap ring to allow rotation but prevent lateral movement. The diameter of the through hole 2302 may step down to a smaller diameter of D23-3 near the second end 2306 of the third pulley P-3. The diameter D23-3 extends a length of L23-4 from the second end 2306. The ratio of the characteristic diameter D23-1 to the diameter D23-2 of the through hole 2302 on the first end 2304 may be between 1 to 1.5. The ratio of the diameter D23-2 of the through hole 2302 at the first end 2304 to the inner diameter D23-3 may be between 1.35 and 1.85. The ratio between the inner diameter D23-3 and the diameter D23-4 of the through hole 2302 at the second end 2306 may be 1 and 1.25. The ratio of the characteristic length L23-1 to the length L23-3 may be between 1 and 1.5.

Figure 24A:
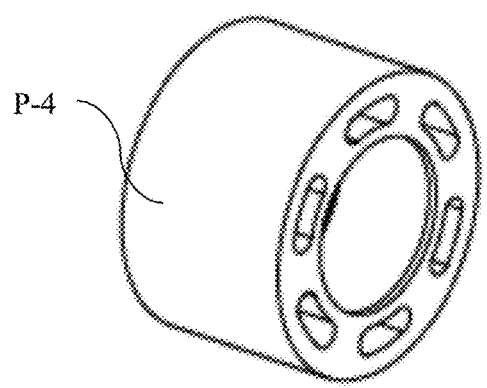
FIGS. 24A-C depict respectively a schematic isometric, front, and cross-sectional view of a fourth pulley.
Figure 24B:
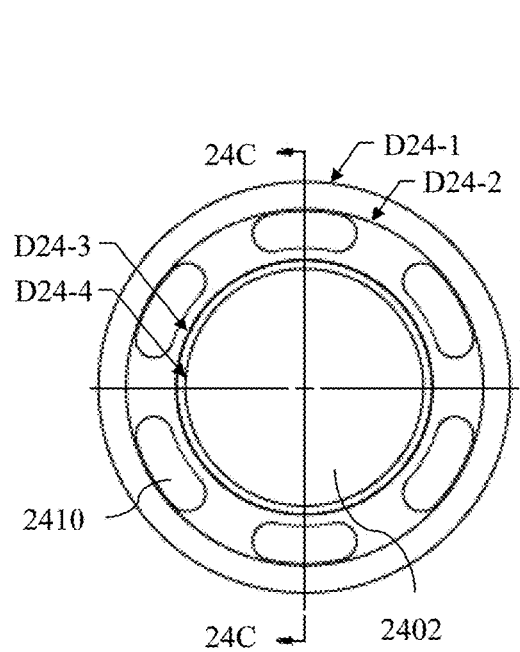
Figure 24C:
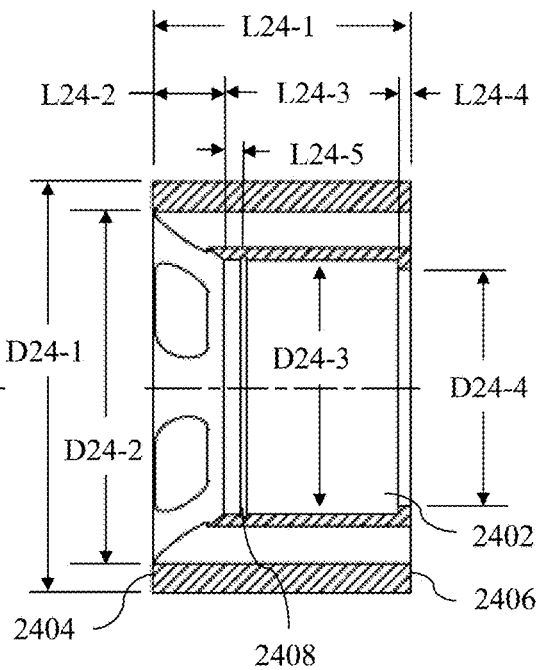

FIGS. 24A-24C illustrate the fourth pulley P-4, which may be a circular bar with a characteristic diameter D24-1 and length L24-1. FIG. 24C is a cross-sectional view of the fourth pulley P-4 according to the cross-section line 24C in FIG. 24B. The fourth pulley P-4 may be made of AISI 1215, 1018, 1045 steel or any other suitable material. The characteristic diameter D24-1 may be between 2.75 and 3.25 inches, but more preferably between 2.9 and 3.1 inches. The characteristic length L24-1 may be between 1.75 and 1.95 inches. The fourth pulley P-4 has a through hole 2402 which may extend the entire length L24-1 of the fourth pulley P-4. The fourth pulley P-4 has a first end 2404 and a second end 2406. The through hole 2402 on the first end has a diameter of D24-1. The through hole 2402 has diameter at the first end of D24-2 and may angle inward for a predetermined length L24-2, and may continue at a constant diameter, or inner diameter D24-3. The inner diameter D24-3 extends for a length of L24-3, except for a circular channel 2408 that is located a length of L24-5 from the beginning of the inner diameter D24-3, until it comes close to the second end 2406. The circular channel 2408 may be used for a snap ring to allow rotation but prevent lateral movement. The diameter of the through hole 2402 may step down to a smaller diameter of D24-4 near the second end 2406 of the fourth pulley P-4. The diameter D24-3 extends a length of L24-4 from the second end 2406. A plurality of vents 2410 are positioned radially around the center of the through hole 2402 and on the angled side of the through hole 2402. The plurality of vents 2410 may extend to the second end 2406. In a non-limiting embodiment, the pulley may have six vents positioned radially around the pulley. The diameter of the circular channel 2408 is greater than the internal diameter of the through hole D24-2, but does not extend into the vents 2410. The ratio of the characteristic diameter D24-1 to the diameter D24-2 of the through hole 2402 on the first end 2404 may be between 1 to 1.5. The ratio of the diameter D24-2 of the through hole 2402 at the first end 2404 to the inner diameter D24-3 may be between 1.15 and 1.65. The ratio between the inner diameter D24-3 and the diameter D24-4 of the through hole 2402 at the second end 2406 may be 1 and 1.25. The ratio of the characteristic length L24-1 to the length L24-3 may be between 1.25 and 1.75.

Figure 25A:
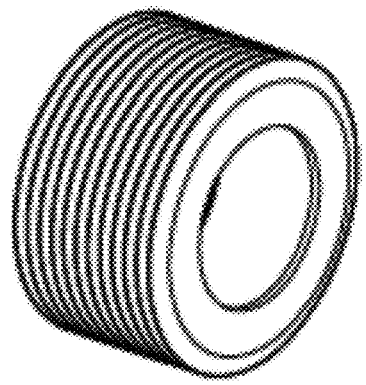
FIGS. 25A-D depict respectively a schematic isometric, front, cross-sectional, and detail view of a fifth pulley.
Figure 25D:
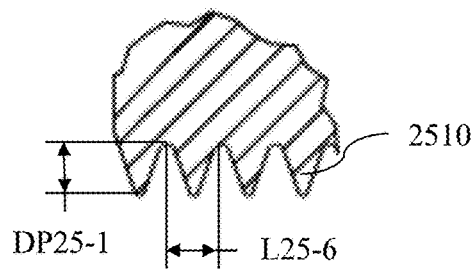
Figure 25B:
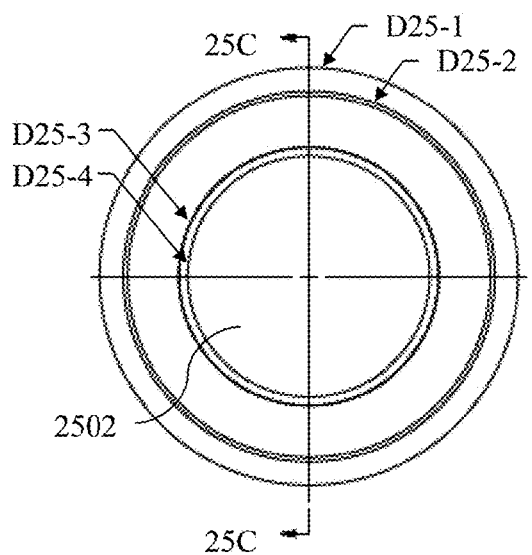
Figure 25C:
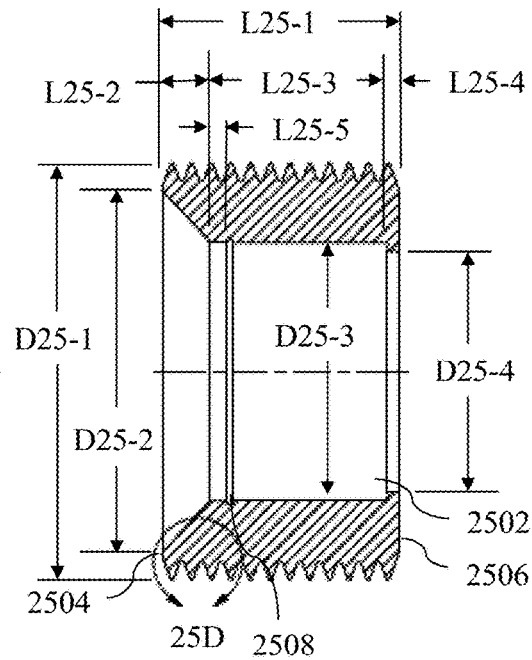

FIGS. 25A-25C illustrates the fifth pulley P-5, which may be a circular bar with a characteristic diameter D25-1 and length L25-1. FIG. 25C is a cross-sectional view of the fifth pulley P-5 according to the cross-section line 25C in FIG. 25B. The fifth pulley P-5 may be made of AISI 1215, 1018, 1045 steel or any other suitable material. The characteristic diameter D25-1 may be between 2.75 and 3.25 inches, but more preferably between 2.9 and 3.1 inches. The characteristic length L25-1 may be between 1.6 and 1.8 inches. The fifth pulley P-5 has a through hole 2502 which extends through the entire length L25-1 of the fifth pulley P-5. The fifth pulley P-5 has a first end 2504 and a second end 2506. The through hole 2502 on the first end 2504 has a diameter of D25-2. The through hole 2502 may angle inward toward the center of the through hole at a fixed angle for a predetermined length L25-2, and may continue at a constant diameter, or inner diameter D25-3. The inner diameter D25-3 may extend for a length of L25-3, except for a circular channel 2508 that is located a length of L25-5 from the beginning of the inner diameter D25-3, until it comes close to the second end 2506. The diameter of the through hole 2502 may step down to a smaller diameter of D25-3 near the second end 2506 of the fifth pulley P-5. The diameter D25-3 may extend a length of L25-4 from the second end 2506. The ratio of the characteristic diameter D25-1 to the diameter D25-2 of the through hole 2502 on the first end 2504 may be between 1 to 1.5. The ratio of the diameter D25-2 of the through hole 2502 at the first end 2504 to the inner diameter D25-3 may be between 1 and 1.5. The ratio between the inner diameter D25-3 and the diameter D25-4 of the through hole 2502 at the second end 2506 may be 1 and 1.25. The ratio of the characteristic length L25-1 to the length L25-3 may be between 1 and 1.5.

The fifth pulley P-5 further includes a plurality of grooves 2510 aligned laterally along the outside of the length of the fifth pulley P-5. FIG. 25D illustrates a detailed view from the detail boundary 25D in FIG. 25C. The grooves 2510 may be equally spaced from each other at a distance L25-6. The distance L25-6 between each groove may be between 0.1 and 0.2 inches, but more preferably between 0.125 and 0.155 inches. Each groove 2510 may also have a predetermined depth of DP25-1. The depth DP25-1 of the groove may be between 0.1 and 0.2 inches, but more preferably between 0.125 and 0.145 inches.

Figure 26A:
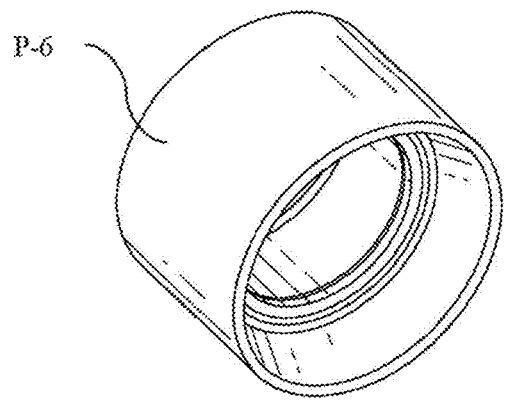
FIGS. 26A-C depict respectively a schematic isometric, front, and cross-sectional view of a sixth pulley.
Figure 26B:
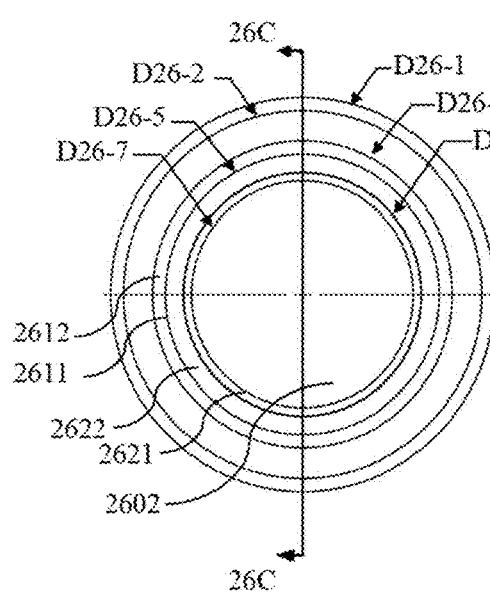
Figure 26C:
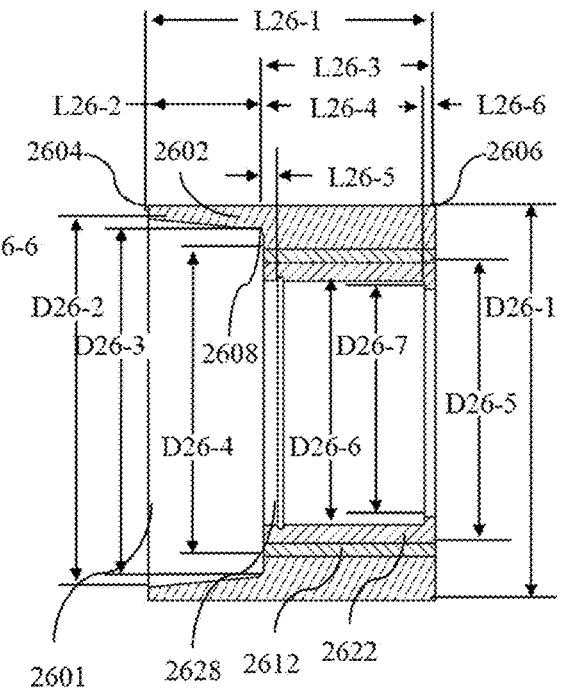

FIGS. 26A-26C illustrate a sixth pulley P-6, which may include a shell 2602, a core 2622, and a middle layer 2612 that bonds concentrically the shell 2602 with the core 2622. The shell 2602 may be made of aluminum or any other suitable material, the core 2622 may be made of AISI 1215, 1018, 1045 steel or any other suitable material, the middle layer 2612 may be made of polymeric material such as synthetic rubber or any other suitable material. The middle layer 2612 provides weight reduction, vibration dampening, and load dampening to extend pulley bearing and tensioner life.

The shell 2602 may be a circular bar with a characteristic diameter D26-1 and a characteristic length L26-1. The characteristic diameter D26-1 may be between 2.75 and 3.25 inches, but more preferably between 2.9 and 3.1 inches. The characteristic length L26-1 may be between 2.15 and 2.35 inches.

The shell 2602 has a shell through hole 2601 which extends through the entire length L26-1. The shell 2602 has a first shell end 2604 and a second shell end 2606. The shell though hole 2601 on the first shell end 2604 has a diameter of D26-2. The shell through hole 2601 may angle inward toward a center of the sixth pulley P-6 at a fixed angle for a predetermined length L26-2 until reaching a shell lip 2608 with a lip diameter D26-3. From the shell lip 2608, the shell through hole 2601 continues at a constant diameter or inner shell diameter D26-4 from a predetermined length L26-3 until reaching the second shell end 2606.

The ratio of the characteristic diameter D26-1 to the diameter D26-2 of the shell though hole 2601 on the first shell end 2604 may be between 1 to 1.1. The ratio of the diameter D26-2 of the shell though hole 2601 on the first shell end 2604 to the lip diameter D26-3 may be between 1 and 1.1. The ratio between the lip diameter D26-3 to the inner shell diameter D26-4 may be between 1 and 1.25. The ratio of the characteristic length L26-1 to the length L26-2 may be between 2 and 3. The ratio of the characteristic length L26-1 to the length L26-3 may be between 1 and 2.

The middle layer 2612 extends from the shell lip 2608 to the second shell end 2606 along the length L26-3 and provides a middle layer through hole 2611 with a middle layer inner diameter D26-5.

The ratio between the inner shell diameter D26-4 to the diameter D26-5 of the middle layer through hole 2611 may be between 1 and 1.1.

The core 2622 extends from the shell lip 2608 to the second shell end 2606 and provides a core through hole 2621 with an inner diameter D26-6 that may extend for a length L26-4, except for a circular channel 2628 that is located a length L26-5 from the shell lip 2608, until it comes close to the second shell end 2606. The circular channel 2608 may be used for a snap ring to allow rotation but prevent lateral movement. The inner diameter D26-6 of the core 2622 may step down to a smaller diameter of D26-7 near the second shell end 2606 of the shell 2602. The diameter D26-7 extends a length of L26-6 from the second shell end 2606.

The ratio between the inner diameter D26-6 of the core 2622 to the diameter D26-7 near the second shell end 2606 of the shell 2602 may be between 1 and 1.01. The ratio of the characteristic length L26-1 to the length L26-4 may be between 1.5 and 2.

FIGS. 27A-27C illustrate a seventh pulley P-7, which may include a shell 2702, a core 2722, and a middle layer 2712 that bonds concentrically the shell 2702 with the core 2722. The shell 2702 may be made of aluminum or any other suitable material, the core 2722 may be made of AISI 1215, 1018, 1045 steel or any other suitable material, the middle layer 2712 may be made of polymeric material such as synthetic rubber or any other suitable material. The middle layer 2712 provides weight reduction, vibration dampening, and load dampening to extend pulley bearing and tensioner life.

The shell 2702 may be a circular bar with a characteristic diameter D27-1 and a characteristic length L27-1. The characteristic diameter D27-1 may be between 2.75 and 3.25 inches, but more preferably between 2.9 and 3.1 inches. The characteristic length L27-1 may be between 1.80 and 2.00 inches.

The shell 2702 has a shell through hole 2701 which extends through the entire length L27-1. The shell 2702 has a first shell end 2704 and a second shell end 2706. The shell though hole 2701 on the first shell end 2704 has a diameter of D27-2. The shell through hole 2701 may angle inward toward a center of the seventh pulley P-7 at a fixed angle for a predetermined length L27-2 until reaching a shell lip 2708 with a lip diameter D27-3. From the shell lip 2708, the shell through hole 2701 continues at a constant diameter or inner shell diameter D27-4 from a predetermined length L27-3 until reaching the second shell end 2706.

The ratio of the characteristic diameter D27-1 to the diameter D27-2 of the shell though hole 2701 on the first shell end 2704 may be between 1 to 1.1. The ratio of the diameter D27-2 of the shell though hole 2701 on the first shell end 2704 to the lip diameter D27-3 may be between 1 and 1.1. The ratio between the lip diameter D26-3 to the inner shell diameter D27-4 may be between 1 and 1.25. The ratio of the characteristic length L27-1 to the length L27-2 may be between 3 and 4. The ratio of the characteristic length L27-1 to the length L27-3 may be between 1.0 and 1.8.

The middle layer 2712 extends from the shell lip 2708 to the second shell end 2706 along the length L27-3 and provides a middle layer through hole 2711 with a middle layer inner diameter D27-5.

The ratio between the inner shell diameter D27-4 to the diameter D27-5 of the middle layer through hole 2711 may be between 1 and 1.1.

The core 2722 extends from the shell lip 2708 to the second shell end 2706 and provides a core through hole 2721 with an inner diameter D27-6 that may extend for a length L27-4, except for a circular channel 2728 that is located a length L27-5 from the shell lip 2708, until it comes close to the second shell end 2706. The circular channel 2708 may be used for a snap ring to allow rotation but prevent lateral movement. The inner diameter D27-6 of the core 2722 may step down to a smaller diameter of D27-7 near the second shell end 2706 of the shell 2702. The diameter D27-7 extends a length of L27-6 from the second shell end 2706.

The ratio between the inner diameter D27-6 of the core 2722 to the diameter D27-7 near the second shell end 2706 of the shell 2702 may be between 1 and 1.01. The ratio of the characteristic length L27-1 to the length L27-4 may be between 1.25 and 1.75.

Figure 28A:
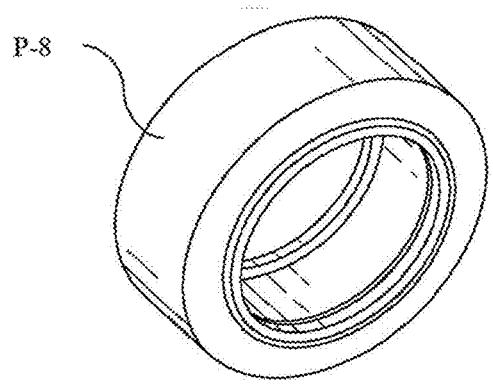
FIGS. 28A-C depict respectively a schematic isometric, front, and cross-sectional view of a eighth pulley.
Figure 28B:
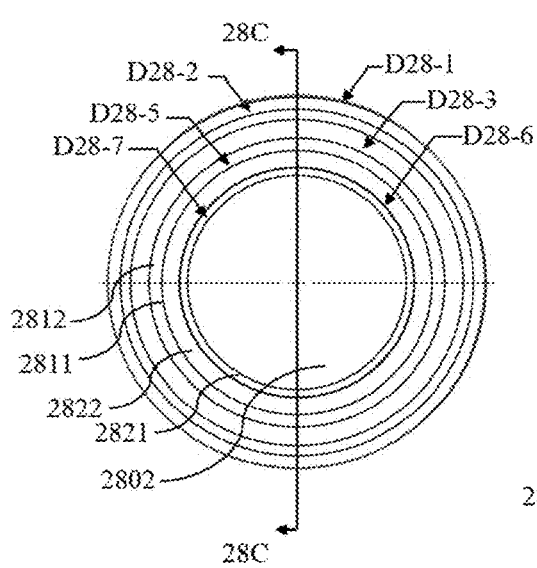
Figure 28C:
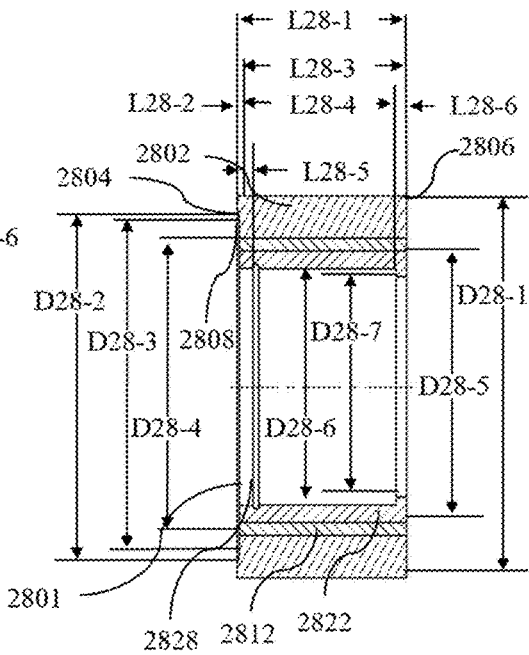

FIGS. 28A-28C illustrate a eighth pulley P-8, which may include a shell 2802, a core 2822, and a middle layer 2812 that bonds concentrically the shell 2802 with the core 2822. The shell 2802 may be made of aluminum or any other suitable material, the core 2822 may be made of AISI 1215, 1018, 1045 steel or any other suitable material, the middle layer 2812 may be made of polymeric material such as synthetic rubber or any other suitable material. The middle layer 2812 provides weight reduction, vibration dampening, and load dampening to extend pulley bearing and tensioner life.

The shell 2802 may be a circular bar with a characteristic diameter D28-1 and a characteristic length L28-1. The characteristic diameter D28-1 may be between 2.75 and 3.25 inches, but more preferably between 2.9 and 3.1 inches. The characteristic length L28-1 may be between 1.80 and 2.00 inches.

The shell 2802 has a shell through hole 2801 which extends through the entire length L28-1. The shell 2802 has a first shell end 2804 and a second shell end 2806. The shell though hole 2801 on the first shell end 2804 has a diameter of D28-2. The shell through hole 2801 may curve inward toward a center of the eighth pulley P-8 for a predetermined length L28-2 until reaching a shell lip 2808 with a lip diameter D28-3. From the shell lip 2808, the shell through hole 2801 continues at a constant diameter or inner shell diameter D28-4 from a predetermined length L28-3 until reaching the second shell end 2806.

The ratio of the characteristic diameter D28-1 to the diameter D28-2 of the shell though hole 2801 on the first shell end 2804 may be between 1 to 1.1. The ratio of the diameter D28-2 of the shell though hole 2801 on the first shell end 2804 to the lip diameter D28-3 may be between 1 and 1.1. The ratio between the lip diameter D28-3 to the inner shell diameter D28-4 may be between 1 and 1.25. The ratio of the characteristic length L28-1 to the length L28-2 may be between 50 and 60. The ratio of the characteristic length L28-1 to the length L28-3 may be between 1 and 1.05.

The middle layer 2812 extends from the shell lip 2808 to the third shell end 2806 along the length L28-3 and provides a middle layer through hole 2811 with a middle layer inner diameter D28-5.

The ratio between the inner shell diameter D28-4 to the diameter D28-5 of the middle layer through hole 2811 may be between 1 and 1.1.

The core 2822 extends from the shell lip 2808 to the second shell end 2806 and provides a core through hole 2821 with an inner diameter D28-6 that may extend for a length L28-4, except for a circular channel 2828 that is located a length L28-5 from the shell lip 2808, until it comes close to the second shell end 2806. The circular channel 2808 may be used for a snap ring to allow rotation but prevent lateral movement. The inner diameter D28-6 of the core 2822 may step down to a smaller diameter of D28-7 near the second shell end 2806 of the shell 2802. The diameter D28-7 extends a length of L28-6 from the second shell end 2806.

The ratio between the inner diameter D28-6 of the core 2822 to the diameter D28-7 near the second shell end 2806 of the shell 2802 may be between 1 and 1.01. The ratio of the characteristic length L28-1 to the length L28-4 may be between 1 and 1.05.

Figure 29A:
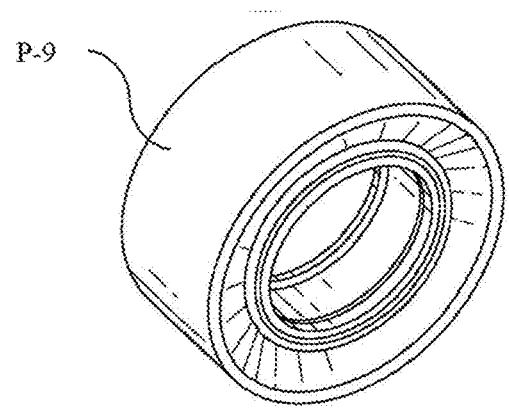
FIGS. 29A-C depict respectively a schematic isometric, front, and cross-sectional view of a ninth pulley.
Figure 29B:
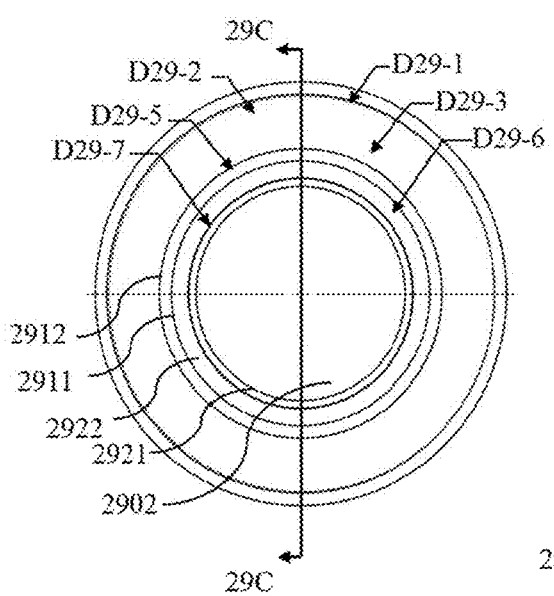
Figure 29C:
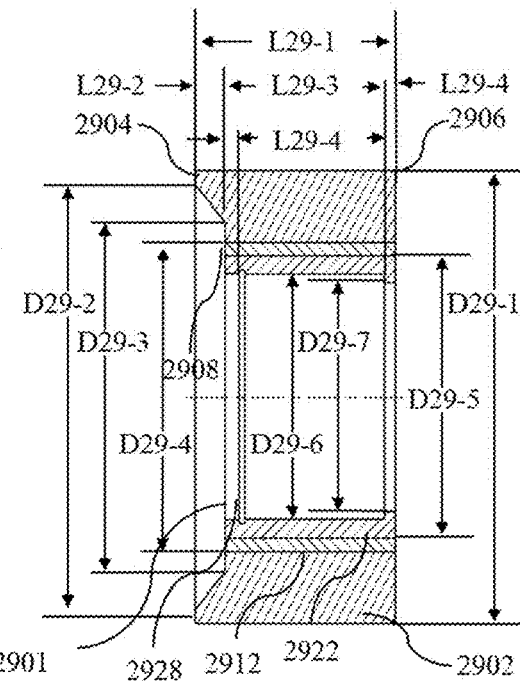

FIGS. 29A-29C illustrate a ninth pulley P-9, which may include a shell 2902, a core 2922, and a middle layer 2912 that bonds concentrically the shell 2902 with the core 2922. The shell 2902 may be made of aluminum or any other suitable material, the core 2922 may be made of AISI 1215, 1018, 1045 steel or any other suitable material, the middle layer 2912 may be made of polymeric material such as synthetic rubber or any other suitable material. The middle layer 2912 provides weight reduction, vibration dampening, and load dampening to extend pulley bearing and tensioner life.

The shell 2902 may be a circular bar with a characteristic diameter D29-1 and a characteristic length L29-1. The characteristic diameter D29-1 may be between 3.15 and 3.65 inches, but more preferably between 3.3 and 3.5 inches. The characteristic length L29-1 may be between 1.50 and 1.70 inches.

The shell 2902 has a shell through hole 2901 which extends through the entire length L29-1. The shell 2902 has a first shell end 2904 and a second shell end 2906. The shell though hole 2901 on the first shell end 2904 has a diameter of D29-2. The shell through hole 2901 may angle inward toward a center of the ninth pulley P-9 at a fixed angle for a predetermined length L29-2 until reaching a shell lip 2908 with a lip diameter D29-3. From the shell lip 2908, the shell through hole 2901 continues at a constant diameter or inner shell diameter D29-4 from a predetermined length L29-3 until reaching the second shell end 2906.

The ratio of the characteristic diameter D29-1 to the diameter D29-2 of the shell though hole 2901 on the first shell end 2904 may be between 1 to 1.1. The ratio of the diameter D29-2 of the shell though hole 2901 on the first shell end 2904 to the lip diameter D29-3 may be between 1 and 1.5. The ratio between the lip diameter D29-3 to the inner shell diameter D28-4 may be between 1 and 1.25. The ratio of the characteristic length L29-1 to the length L29-2 may be between 6 and 7. The ratio of the characteristic length L29-1 to the length L29-3 may be between 1 and 1.5.

The middle layer 2912 extends from the shell lip 2908 to the second shell end 2906 along the length L29-3 and provides a middle layer through hole 2911 with a middle layer inner diameter D29-5.

The ratio between the inner shell diameter D29-4 to the diameter D29-5 of the middle layer through hole 2911 may be between 1 and 1.1.

The core 2922 extends from the shell lip 2908 to the second shell end 2906 and provides a core through hole 2921 with an inner diameter D29-6 that may extend for a length L29-4, except for a circular channel 2928 that is located a length L29-5 from the shell lip 2908, until it comes close to the second shell end 2906. The circular channel 2908 may be used for a snap ring to allow rotation but prevent lateral movement. The inner diameter D29-6 of the core 2922 may step down to a smaller diameter of D29-7 near the second shell end 2906 of the shell 2902. The diameter D29-7 extends a length of L29-6 from the second shell end 2906.

The ratio between the inner diameter D29-6 of the core 2922 to the diameter D29-7 near the second shell end 2906 of the shell 2902 may be between 1 and 1.01. The ratio of the characteristic length L29-1 to the length L29-4 may be between 1 and 1.5.

FIGS. 30A-30D illustrate a tenth pulley P-10, which may include a shell 3002, a core 3022, and a middle layer 3012 that bonds concentrically the shell 3002 with the core 3022. The shell 3002 may be made of aluminum or any other suitable material, the core 3022 may be made of AISI 1215, 1018, 1045 steel or any other suitable material, the middle layer 3012 may be made of polymeric material such as synthetic rubber or any other suitable material. The middle layer 3012 provides weight reduction, vibration dampening, and load dampening to extend pulley bearing and tensioner life.

The shell 3002 may be a circular bar with a characteristic diameter D30-1 and a characteristic length L30-1. The characteristic diameter D30-1 may be between 2.75 and 3.25 inches, but more preferably between 2.9 and 3.1 inches. The characteristic length L30-1 may be between 1.60 and 1.80 inches.

The shell 3002 has a shell through hole 3001 which extends through the entire length L30-1. The shell 3002 has a first shell end 3004 and a second shell end 3006. The shell though hole 3001 on the first shell end 3004 has a diameter of D30-2. The shell through hole 3001 may angle inward toward a center of the tenth pulley P-10 at a fixed angle for a predetermined length L30-2 until reaching a shell lip 3008 with a lip diameter D30-3. From the shell lip 3008, the shell through hole 3001 continues at a constant diameter or inner shell diameter D30-4 from a predetermined length L30-3 until reaching the second shell end 3006.

The ratio of the characteristic diameter D30-1 to the diameter D30-2 of the shell though hole 3001 on the first shell end 3004 may be between 1 to 1.5. The ratio of the diameter D30-2 of the shell though hole 3001 on the first shell end 3004 to the lip diameter D30-3 may be between 1 and 1.5. The ratio between the lip diameter D30-3 to the inner shell diameter D30-4 may be between 1 and 1.5. The ratio of the characteristic length L30-1 to the length L30-2 may be between 4 and 6. The ratio of the characteristic length L30-1 to the length L30-3 may be between 1 and 1.5.

The middle layer 3012 extends from the shell lip 3008 to the second shell end 3006 along the length L30-3 and provides a middle layer through hole 3011 with a middle layer inner diameter D30-5.

The ratio between the inner shell diameter D30-4 to the diameter D30-5 of the middle layer through hole 3011 may be between 1 and 1.1.

The core 3022 extends from the shell lip 3008 to the second shell end 3006 and provides a core through hole 3021 with an inner diameter D30-6 that may extend for a length L30-4, except for a circular channel 3028 that is located a length L30-5 from the shell lip 3008, until it comes close to the second shell end 3006. The circular channel 3008 may be used for a snap ring to allow rotation but prevent lateral movement. The inner diameter D30-6 of the core 3022 may step down to a smaller diameter of D30-7 near the second shell end 3006 of the shell 3002. The diameter D30-7 extends a length of L30-6 from the second shell end 3006.

The ratio between the inner diameter D30-6 of the core 3022 to the diameter D30-7 near the second shell end 3006 of the shell 3002 may be between 1 and 1.01. The ratio of the characteristic length L30-1 to the length L30-4 may be between 1 and 1.5.

Figure 30A:
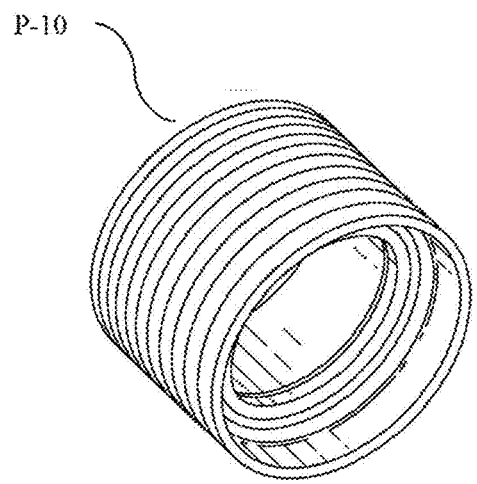
FIGS. 30A-D depict respectively a schematic isometric, front, cross-sectional, and detail view of a tenth pulley.
Figure 30D:
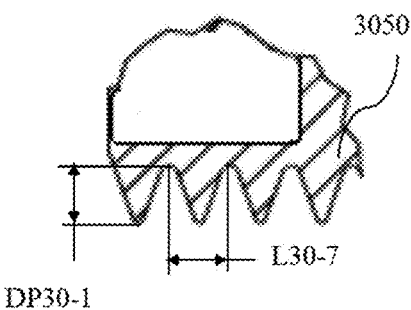
Figure 30B:
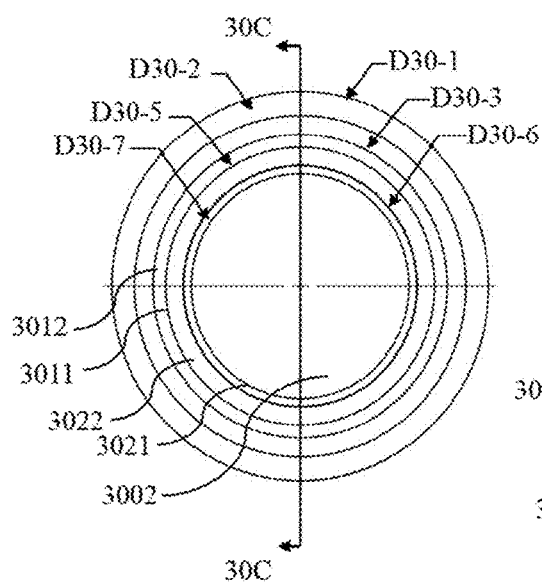
Figure 30C:
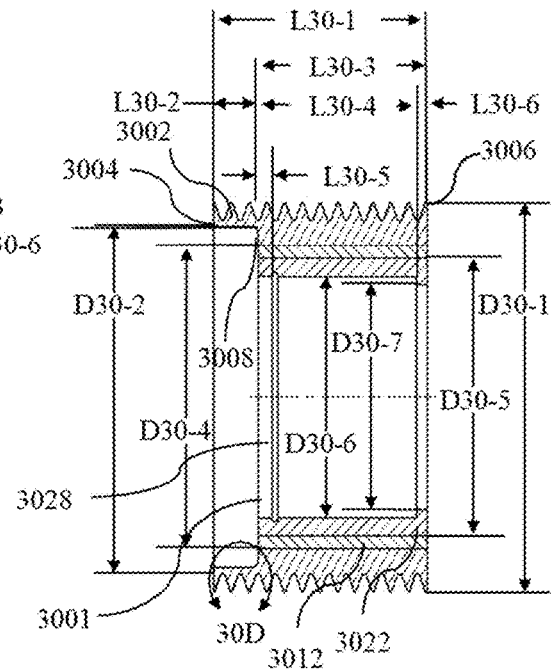

The tenth pulley P-10 further includes a plurality of grooves 3050 aligned laterally along the outside of the length of the tenth pulley P-10. FIG. 30D illustrates a detailed view from the detail boundary 30D in FIG. 30C. The grooves 3050 may be equally spaced from each other at a distance L30-7. The distance L30-7 between each groove may be between 0.1 and 0.2 inches, but more preferably between 0.125 and 0.155 inches. Each groove 3050 may also have a predetermined depth of DP30-1. The depth DP30-1 of the groove may be between 0.1 and 0.2 inches, but more preferably between 0.125 and 0.145 inches.

FIGS. 31-33 illustrate more detailed views of other components of the modular tensioner system that were previously illustrated in FIG. 1. FIGS. 31A-B illustrate a front and side view of the anti-friction disks 110 and 206.

FIGS. 32A-B illustrate a front and side view of the retainer plate 112 that may be fastened to the splined torsion shaft 124 by way of the retainer plate screw 114. The shank of the retainer plate screw 114 passes through a through hole 3202 that is located on the retainer plate 112.

FIGS. 33A-B illustrate the front and cross-sectional view of the index plate retainer 120 that is used to fastened the index plate retainer 120 to the splined torsion shaft 124 by way of the index plate retainer screw 122. FIG. 33B is a cross-sectional view according to the cross-section line 33B in FIG. 33A. The shank of the index plate retainer screw 122 pass through a through hole 3302 that is located on the index plate retainer 120. The shape of the index plate retainer 120 is shaped to correspond to the shape of the splined torsion shaft 124.

Figure 34A:
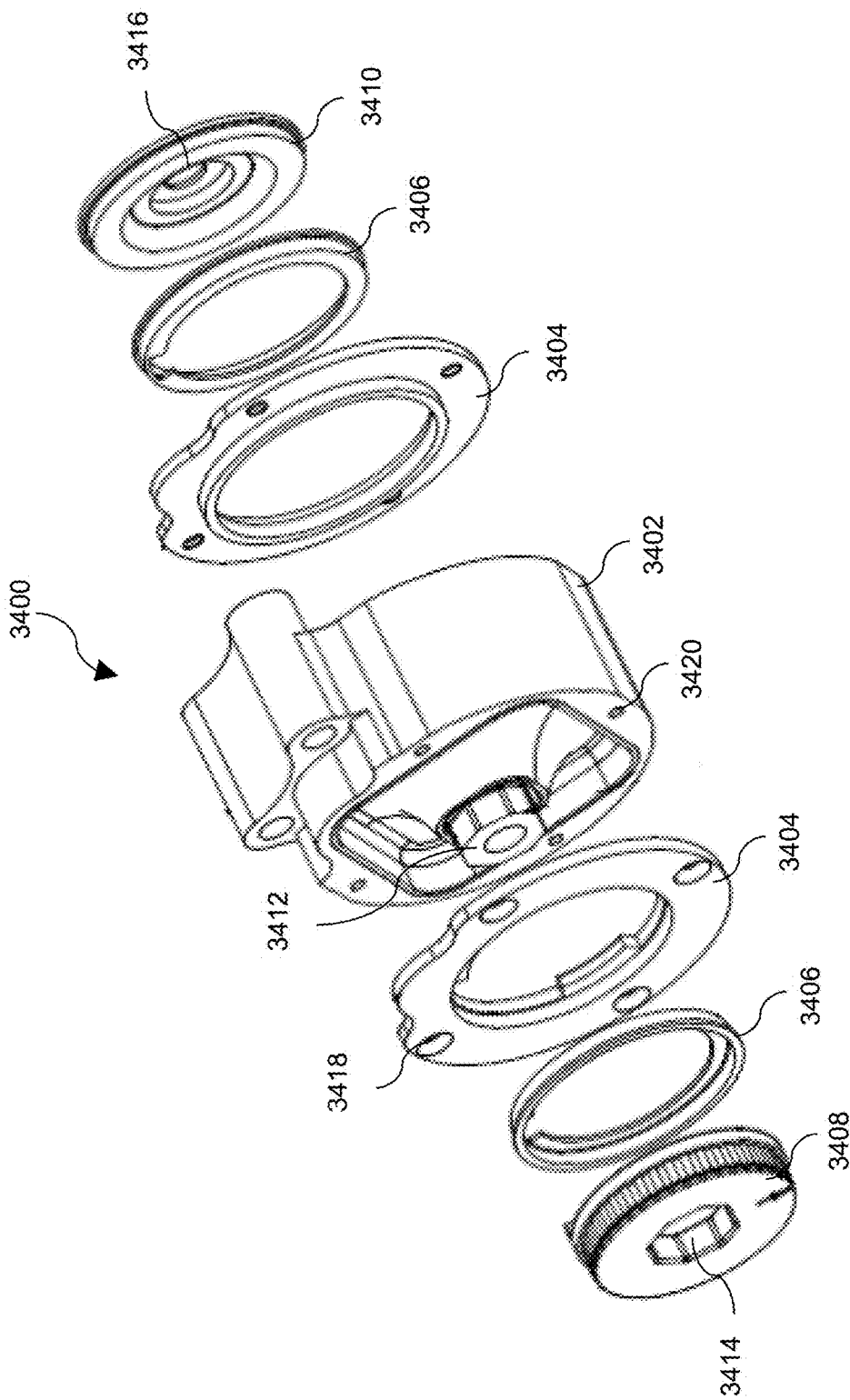
FIGS. 34A-B depict respectively a schematic isometric exploded views of one embodiment of a torsion assembly.
Figure 34B:
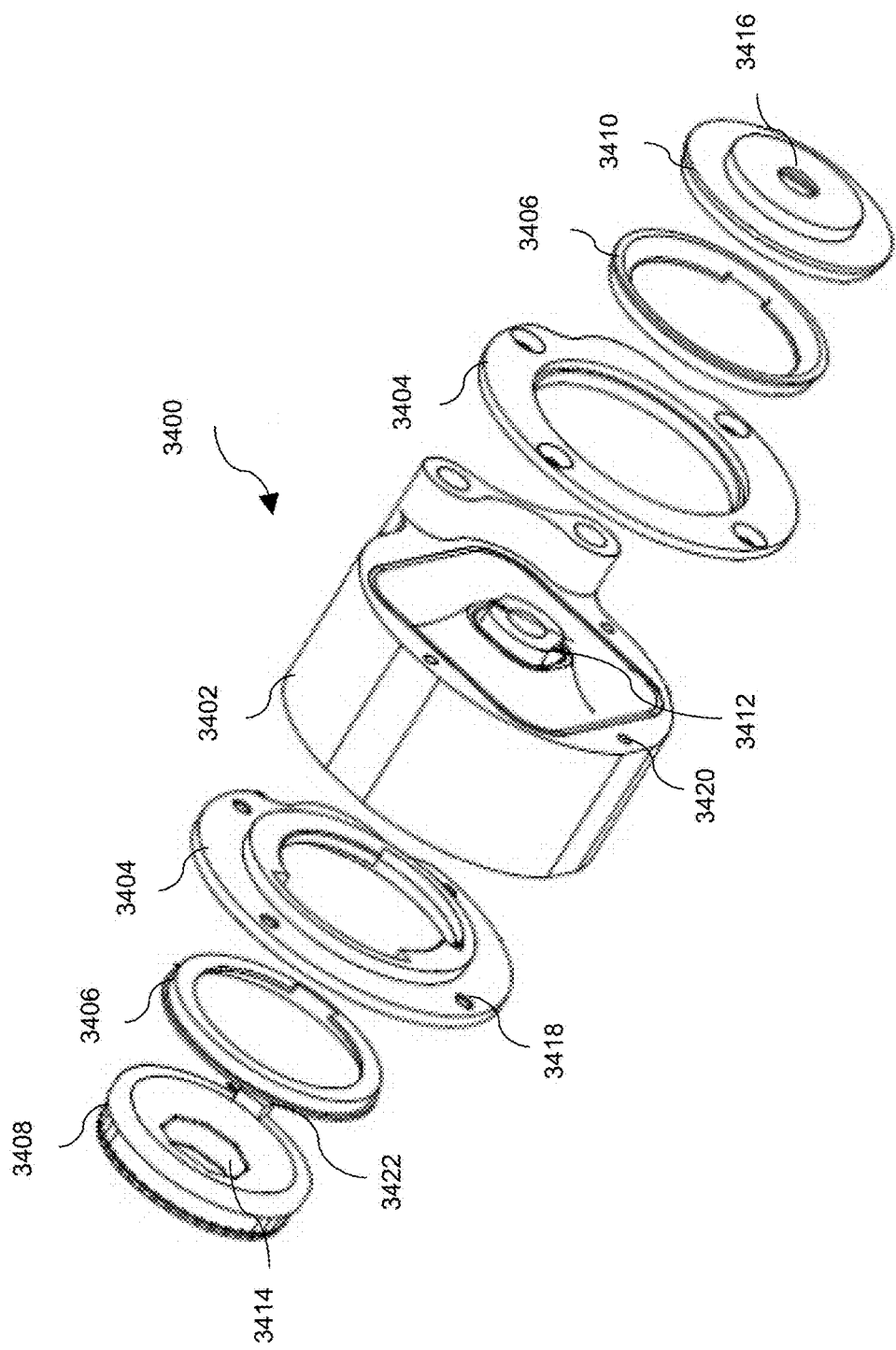

FIGS. 34A-B illustrate a schematic isometric exploded view of another exemplary embodiment of a torsion assembly 3400 according to one example. The torsion assembly 3400 may include a torsion shaft assembly 3402, a pair of end caps 3404, a pair of bushings 3406, a splined index plate 3408, a retaining bushing 3410, and a torsion bar 3412. The torsion assembly 3400 may also include a roller arm (not shown in FIG. 34), roller arm retaining fasteners 106 (not shown in FIG. 34), and a pulley (not shown in FIG. 34).

The pair of end caps 3404 may be connected to opposing ends of the torsion shaft assembly 3402 by fasteners (not shown). The pair of end caps 3404 may have a plurality of holes for attaching the end caps 3404 to the torsion shaft assembly 3402. The torsion shaft assembly may have a plurality of corresponding blind holes 3420 to attached the end caps 3404 to the torsion shaft assembly 3402. The pair of bushings 3406 may be connected to the end caps 3404 on opposing sides. The splined index plate 3408 may connect directly to the torsion shaft assembly 3402 by way of the torsion bar 3412. The splined index plate 3408 may secure the bushing 3406 and end cap 3404 to the torsion shaft assembly 3402. The splined index plate 3408 may include an anti-rotation pin 3422. The anti-rotation pin 3422 can prevent rotation. On the other side of the torsion shaft assembly, a retainer bushing 3410 may connect directly to the torsion shaft assembly 3402 by way of the torsion bar 3412.

Figures 35A, 35B:
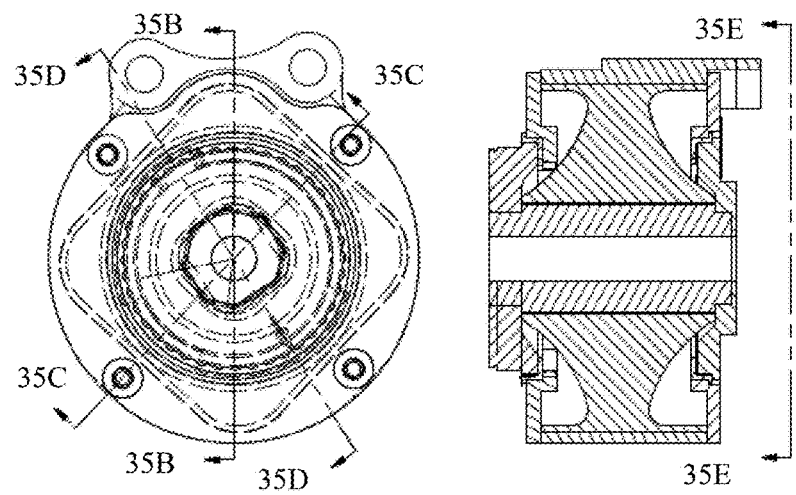
FIGS. 35A-F depict respectively a front, cross-sectional, and detail views of one embodiment of an assembled torsion assembly.
Figures 35C, 35D:
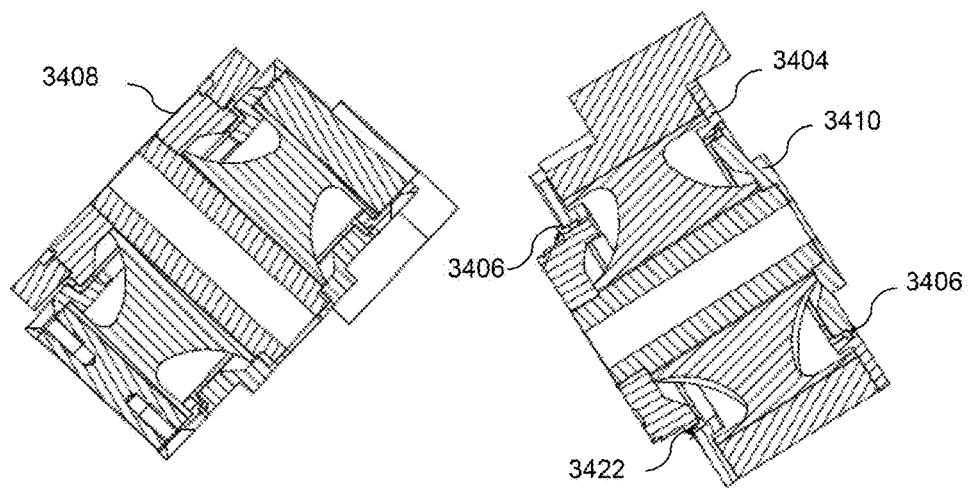
Figure 35E:
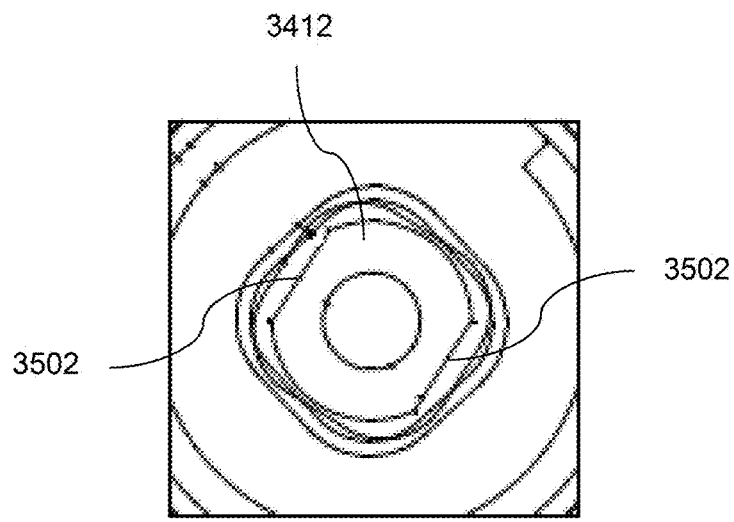
Figure 35F:
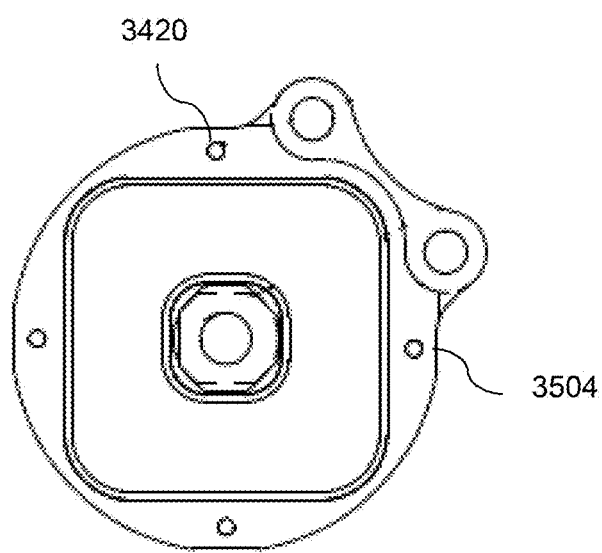

FIGS. 35A-F illustrate various views of an assembled torsion assembly illustrated in FIGS. 34A-B (roller arm and pulley not shown). FIGS. 35B, 35C, and 35D are cross-sectional views of the assembled torsion assembly 3400. FIG. 35E illustrates a detailed view of the rear of the torsion assembly 3400. FIG. 35F illustrates a front view of the torsion assembly 3402.

FIG. 35E illustrates a rear detailed view of the torsion assembly 3402. Specifically, the torsion bar 3412 has flats 3502 that are machined on a center shaft of the torsion assembly 3402. The flats 3502 are used for applying a preload to the torsion bar 3412.

FIG. 35F illustrates a front view of the torsion assembly 3402. The blind holes 3420 may have a non-symmetrical hole pattern, for one way assembly. The torsion assembly 3402 may further include machined tabs 3504.

Figure 36A:
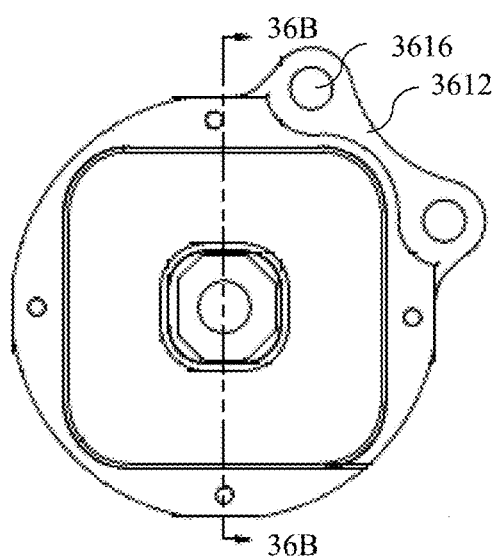
FIGS. 36A-B depict respectively a front and cross-sectional view of a torsion shaft assembly.

FIG. 36A illustrates a front view of the torsion shaft assembly 3402. The torsion shaft assembly 3402 may include three different components, an outer housing 3602, elastomeric material 3604, and the torsion bar 3412. The elastomeric material 3604 may be made of rubber, composites, polymers, or the like.

The outer housing 3602 includes an attachment extension 3612, that extends from the outer housing 3602. The attachment extension 3612 includes a plurality of attachment extension through holes 3616 that extend longitudinally through the attachment extension 3612. The roller arm 104 attaches to the housing by way of the attachment extension 3612. The roller arm retaining fasteners 116 secure the roller arm 104 to the outer housing 3602. The outer housing 3602 further includes an outer housing through hole 3618 that allows the elastomeric material 3604 to be bonded outer housing through hole 3618, which is illustrated in FIGS. 37A-D.

The outer edge of the elastomeric material 3604 is bonded to the inner edge of the outer housing through hole 3618. The elastomeric material 3604 may have a torsion bar through hole 3620. The elastomeric material 3604 is also bonded to the torsion bar 3412. The elastomeric material 3604 acts like the plurality of springs 204 described above.

Figure 36B:
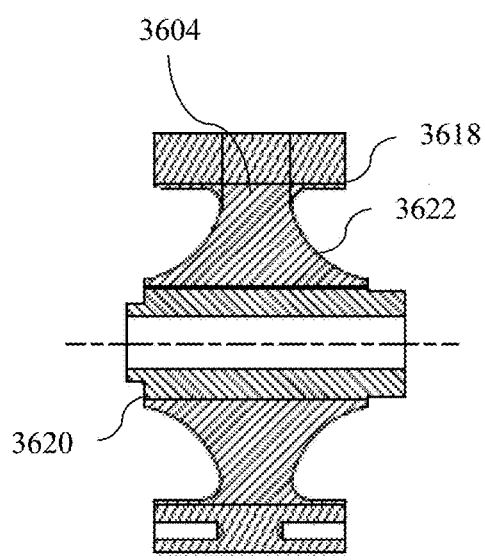

The elastomeric material 3604 may have a variety of different shapes in order to provide the proper amount of torque versus rotation. FIG. 36B illustrates on exemplary embodiment of the shape of the elastomeric material 3604. As illustrated, the elastomeric material 3604 is bonded along a majority of the torsion bar 3412. The elastomeric material 3604 may have a concave shape 3622 in a radial direction from a center of the elastomeric material 3604.

FIG. 36B illustrates a cross-sectional view of the torsion shaft assembly 3402. As illustrated in FIG. 36B, the elastomeric material 3604 is bonded along the entirety of the outer housing through hole 3618.

FIGS. 37A-D illustrate a isometric, front, side, and rear view of the outer housing 3602 and its respective components. FIGS. 37A-D illustrate a generic outer housing because the outer housing 3602 may come in many different shapes and sizes. For example, the four different housing embodiments are illustrated in FIGS. 14-17.

FIGS. 38A-E illustrate isometric views, a front view, a side view, and a rear view of the torsion bar 3412. The torsion bar 3412 includes three sections, 38*a*, 38*b*, and 38*c*. The first section 38*a* includes an octagonal end piece 3802, see FIG. 38C, however, various other shapes may be used. The octagonal end piece 3802 corresponds to a through hole 3414 of the splined index plate 3408.

The second section 38*b* may be a bar with a square cross-section and rounded edges. The elastomeric material 3604 may be bonded along the entire length of the second section 38*b*.

The third section 38*c*, includes an end piece 3804 that corresponds to a retainer bushing through hole 3416. The end piece 3804 may have flat sides and arc-shaped ends, see FIG. 38E, however, various other shapes may be used.

FIG. 38D is a side view of the torsion shaft 3412 and illustrates the various lengths of the torsion shaft 3412. The length of section 38*a*, L38*a*, may be between 0.1 and 0.5 inches, but more preferably between 0.25 and 0.35 inches. The length of section 38*b*, L38*b*, may be between 1.5 and 2.0 inches, but more preferably between 1.65 and 1.85 inches. The length of section 38*c*, L38*c*, may be between 0.1 and 0.2 inches, but more preferably between 0.125 and 0.175 inches.

As discussed above, the molded rubber may be bonded along the entire length of section 38*b*, and not bonded to sections 38*a* and 38*c*.

The torsion bar 3412 may have a through hole 3806 that extends the entire length of the torsion bar 3412.

Obviously, numerous modifications and variations of the present invention are possible in light of the above teachings. It is therefore to be understood that within the scope of the appended claims, the invention may be practiced otherwise than as specifically described herein.

What is claimed is:

1. A method for assembling a replacement tensioner system from modular components, comprising:
   determining a type of tensioner to be replaced;
   selecting a pulley from a plurality of pulleys, each of said plurality of pulleys being adapted to serve as a substitute for a plurality of differently configured tensioner systems;
   selecting a housing for a torsion shaft assembly from a plurality of housings, each of said plurality of housings being adapted to serve as a substitute for a plurality of differently configured tensioner systems;
   selecting a roller arm from a plurality of roller arms, each of said plurality of roller arms being adapted to serve as a substitute for a plurality of differently configured tensioner systems;
   assembling the selected pulley, the selected housing, and selected roller arm to create a tensioner system;
   selecting an index plate locating pin from a plurality of index plate locating pins, each of said plurality of index plate locating pins being adapted to serve as a substitute for a plurality of differently configured tensioner systems; and,
   selecting a location to insert the index plate locating pin within a 360° orientation on an index plate, the index plate being attached to the torsion shaft assembly, wherein the index plate includes a plurality of insertion holes that are aligned circumferentially along the index plate.

2. The method of claim 1, wherein the plurality of pulleys comprises at least ten differently configured pulleys.

3. The method of claim 1, wherein the plurality of housings for a torsion shaft assembly comprises at least four differently configured housings.

4. The method of claim 1, wherein the plurality of roller arms comprises at least three differently configured housings.

5. The method of claim 1, wherein the plurality of index plate locating pins comprises at least two differently configured index plate locating pins.

6. The method of claim 1, wherein the selection of the modular components further comprises:
   measuring dimensions of the components of a current tensioner to be replaced; and
   determining which components to select based on the measurements obtained and examination of a chart.

7. The method of claim 6, further comprising measuring a height of a roller arm of the tensioner to be replaced.

8. The method of claim 6, further comprising measuring a diameter of a pulley of the tensioner to be replaced.

9. The method of claim 6, further comprising measuring a length of a pulley of the tensioner to be replaced.

10. The method of claim 6, further comprising measuring an inner edge of a pulley of the tensioner to be replaced.

11. The method of claim 6, further comprising measuring a diameter of an index plate locating pin head of the tensioner to be replaced.

12. The method of claim 6, further comprising measuring an angle at which an index plate locating pin is inserted into an index plate.

* * * * *